(12) United States Patent
Dick et al.

(10) Patent No.: US 7,890,453 B2
(45) Date of Patent: Feb. 15, 2011

(54) METHOD AND SYSTEM FOR MAINTAINING ENGINEERING PROJECT DOCUMENTATION

(75) Inventors: Alan Jeremy Dick, East Hagbourne (GB); Simon Christopher Barnard Wills, Cheltenham (GB)

(73) Assignee: Integrate Systems Engineering Ltd., London (GB)

( * ) Notice: Subject to any disclaimer, the term of this patent is extended or adjusted under 35 U.S.C. 154(b) by 611 days.

(21) Appl. No.: 11/939,240

(22) Filed: Nov. 13, 2007

(65) Prior Publication Data

US 2008/0120479 A1   May 22, 2008

(30) Foreign Application Priority Data

Nov. 13, 2006   (GB) ................. 0622518.9

(51) Int. Cl.
  G06F 7/00   (2006.01)
  G06F 17/00  (2006.01)
(52) U.S. Cl. ...................................... 707/608
(58) Field of Classification Search ............ None
  See application file for complete search history.

(56) References Cited

U.S. PATENT DOCUMENTS 5,592,661 A   1/1997   Eisenberg et al.
5,678,040 A   10/1997  Vasudevan et al.
2005/0102314 A1  5/2005   Howard et al.

Primary Examiner—Pierre M Vital
Assistant Examiner—Jason Liao
(74) Attorney, Agent, or Firm—Haynes Beffel & Wolfeld LLP; Ernest J. Beffel, Jr.

(57) ABSTRACT

A method of configuration controlling a hierarchy of data arrays is disclosed, each data array in the hierarchy having at least one version, each version of each data array in the hierarchy being associated with one version of at least one other data array in the hierarchy, each data array comprising at least one data entry, each data entry comprising a plurality of fields, the plurality of fields comprising a version field and at least one characteristic field having a characteristic, the version field indicating which version of that data array the associated characteristic fields belong to. The method comprises the steps of: (i) defining a package of data arrays comprising a predetermined version of at least two data arrays in the hierarchy and in which at least one of the data arrays is to be updated to a new version based on a previous version; and (ii) appending a new version indicator indicative of the new version to each data entry having the previous version in the at least one of the data arrays. By associating data entries with more than one version, the need to copy all the data entries within a data array to be updated is obviated. This in turn reduces the amount of additional data which needs to be created and can simplify the relationships between characteristics in different levels of the hierarchy.

25 Claims, 17 Drawing Sheets

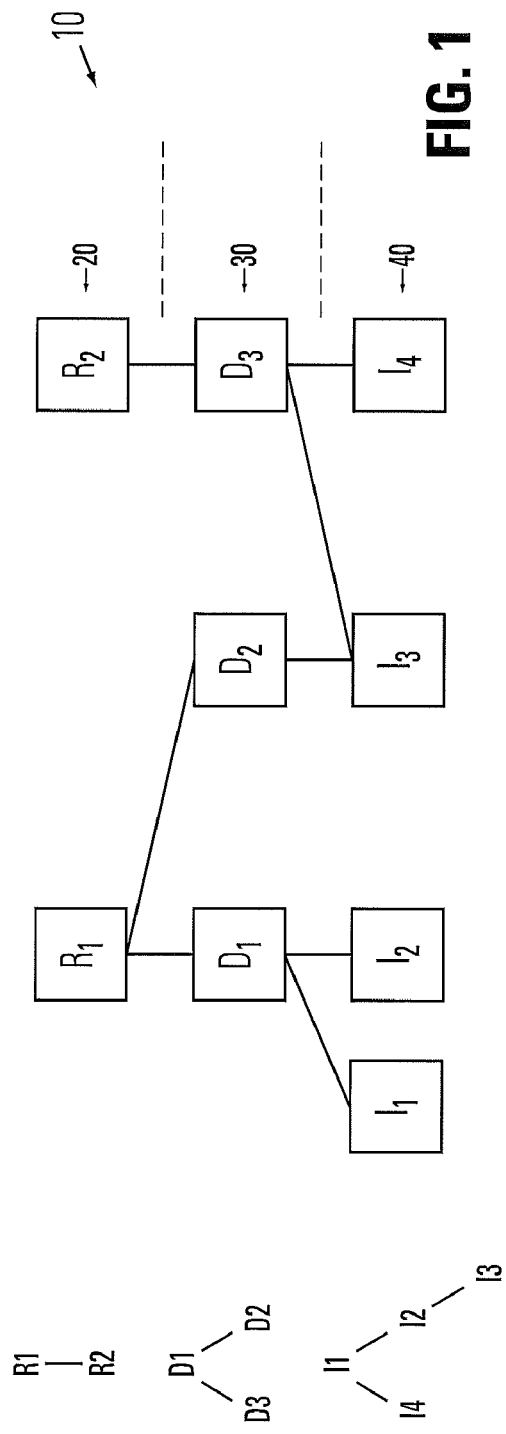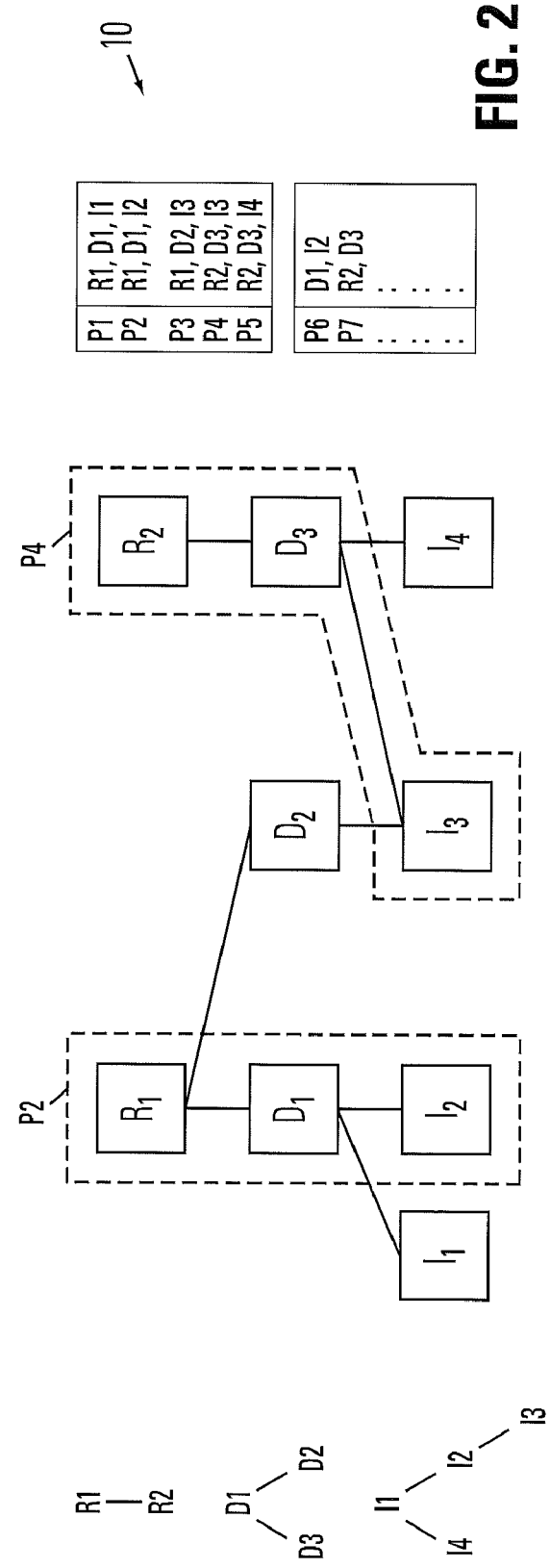

FIG. 3A

| | R Criteria 1 | R Status A1 |
|---|---|---|
| R1 | R Criteria 2 | R Status A2 |
| R1 | R Criteria 3 | R Status A3 |
| R1 | R Criteria 4 | R Status A4 |
| R1 | .. | .. |
| R1 | .. | .. |
| R1 | R Criteria n | R Status An |

FIG. 3B

| R1,R2 | R Criteria 1 | R Status A1 |
|---|---|---|
| R1,R2 | R Criteria 2 | R Status A2 |
| R1,R2 | R Criteria 3 | R Status A3 |
| R1,R2 | R Criteria 4 | R Status A4 |
| | .. | .. |
| | .. | .. |
| R1,R2 | R Criteria n | R Status An |

FIG. 3C

| R1,R2 | R Criteria 1 | R Status A1 |
|---|---|---|
| R1,R2 | R Criteria 2 | R Status A2 |
| R1 | R Criteria 3 | R Status A3 |
| R2 | R Criteria 3' | R Status A3' |
| R1,R2 | R Criteria 4 | R Status A4 |
| | .. | .. |
| | .. | .. |
| R1,R2 | R Criteria n | R Status An |

FIG. 3D

| R1,R2 | R Criteria 1 | R Status A1, R1 | R Status A1', R2 |
|---|---|---|---|
| R1,R2 | R Criteria 2 | R Status A2, R1 | R Status A2', R2 |
| R1,R2 | R Criteria 3 | R Status A3, R1 | R Status A3', R2 |
| R1,R2 | R Criteria 4 | R Status A4, R1 | R Status A4', R2 |
| | | .. | .. |
| | | .. | .. |
| R1,R2 | R Criteria n | R Status An, R1 | R Status An, R2 |

FIG. 3E

| R1 | R Criteria 1 | R Status A1 |
|---|---|---|
| R1 | R Criteria 2 | R Status A2 |
| R1 | R Criteria 3 | R Status A3 |
| R1 | R Criteria 4 | R Status A4 |
| | .. | .. |
| | .. | .. |
| R1 | R Criteria n | R Status An |

FIG. 3F

| | R1 | R Criteria 1 | R Status A1 |
|---|---|---|---|
| CR1 | R1 | R Criteria 2 | R Status A2 |
| | R1 | R Criteria 3 | R Status A3 |
| | R1 | R Criteria 4 | R Status A4 |
| | CR1 | R Criteria 2' | R Status A2' |
| | | .. | .. |
| | | .. | .. |
| | R1 | R Criteria n | R Status An |

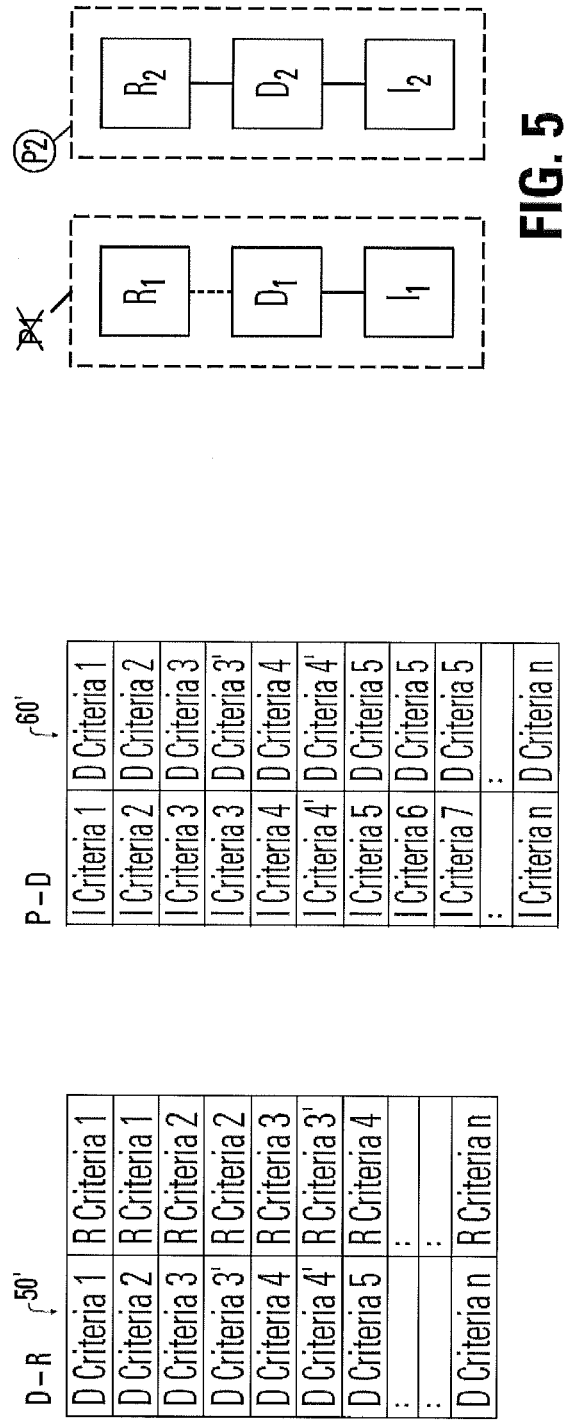

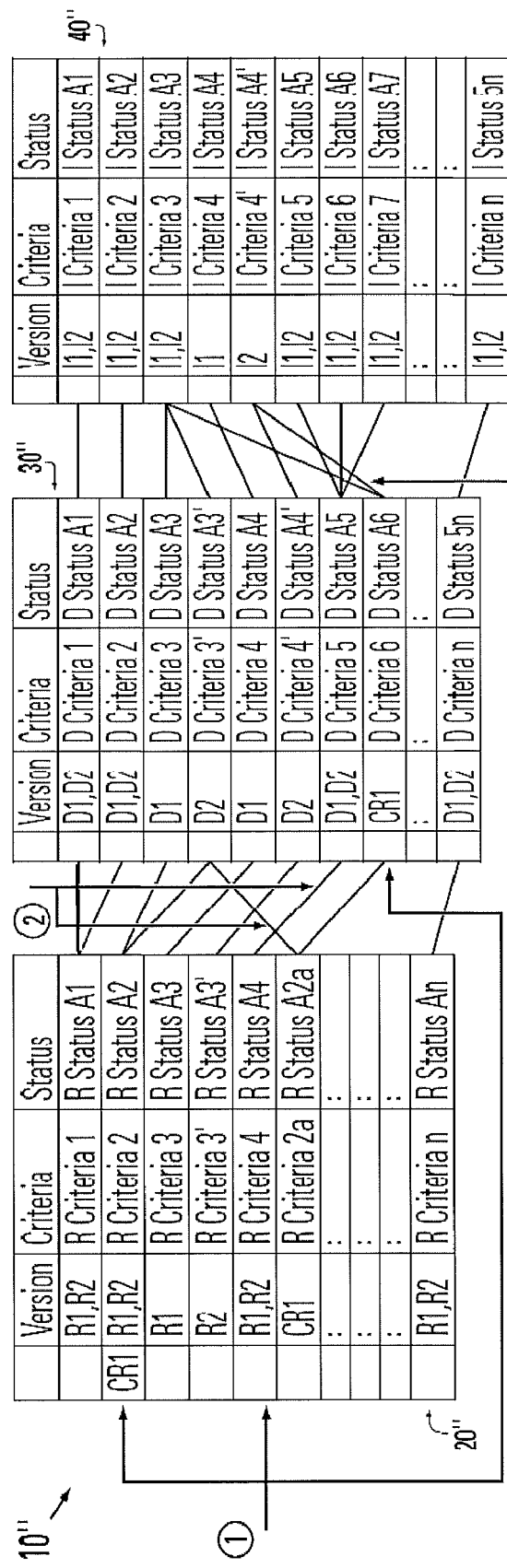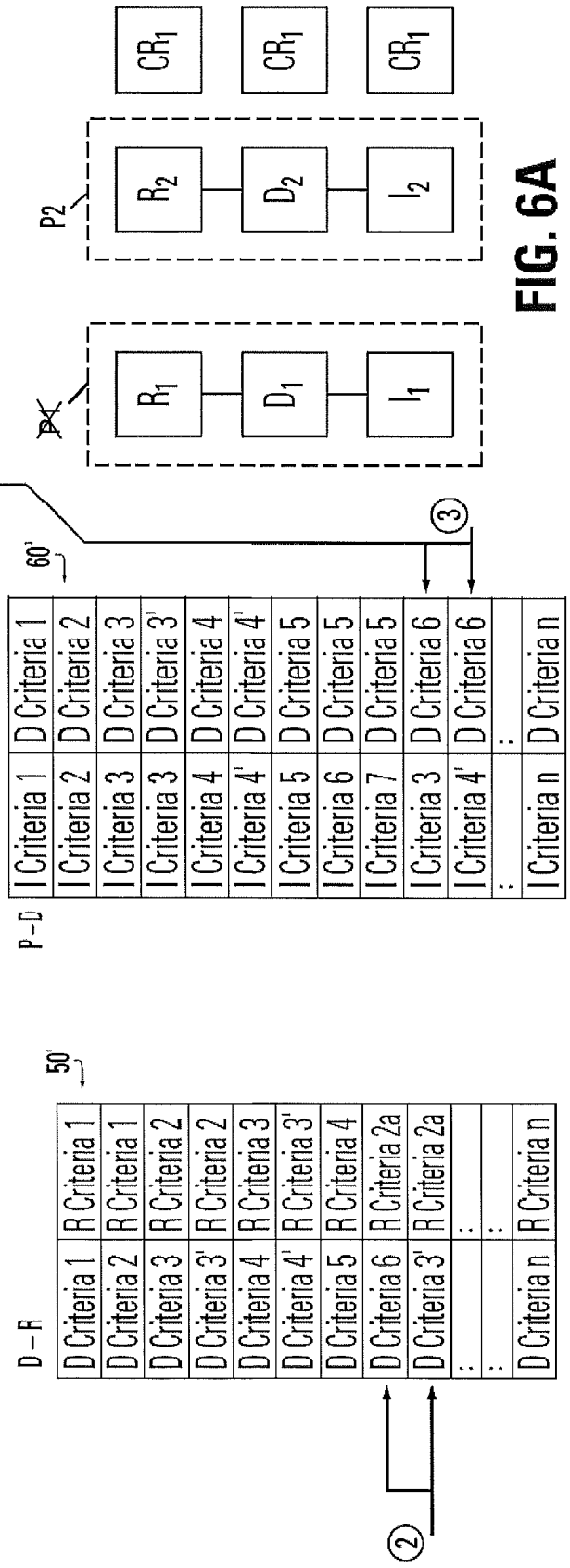
FIG. 6A

FIG. 6B

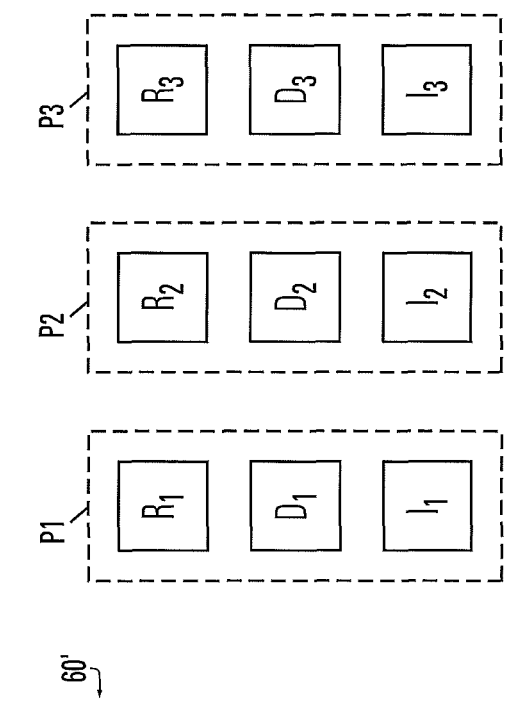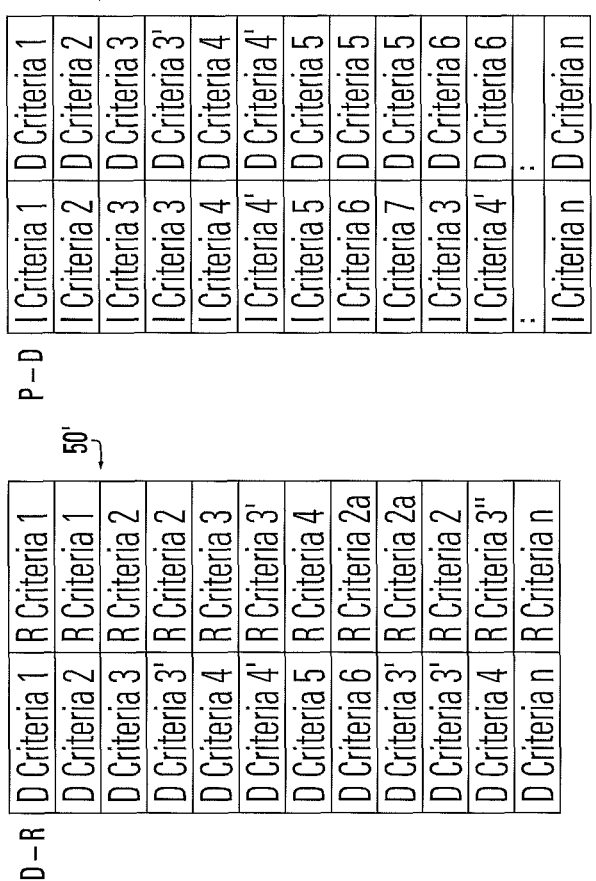
FIG. 6D

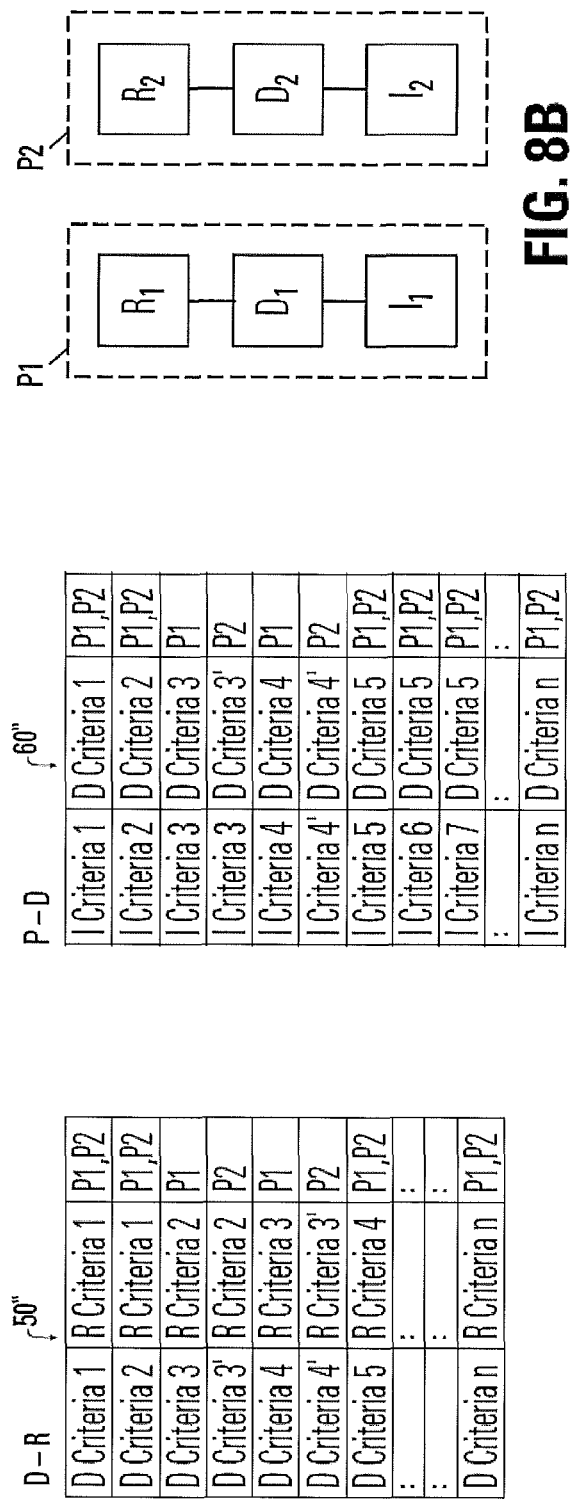

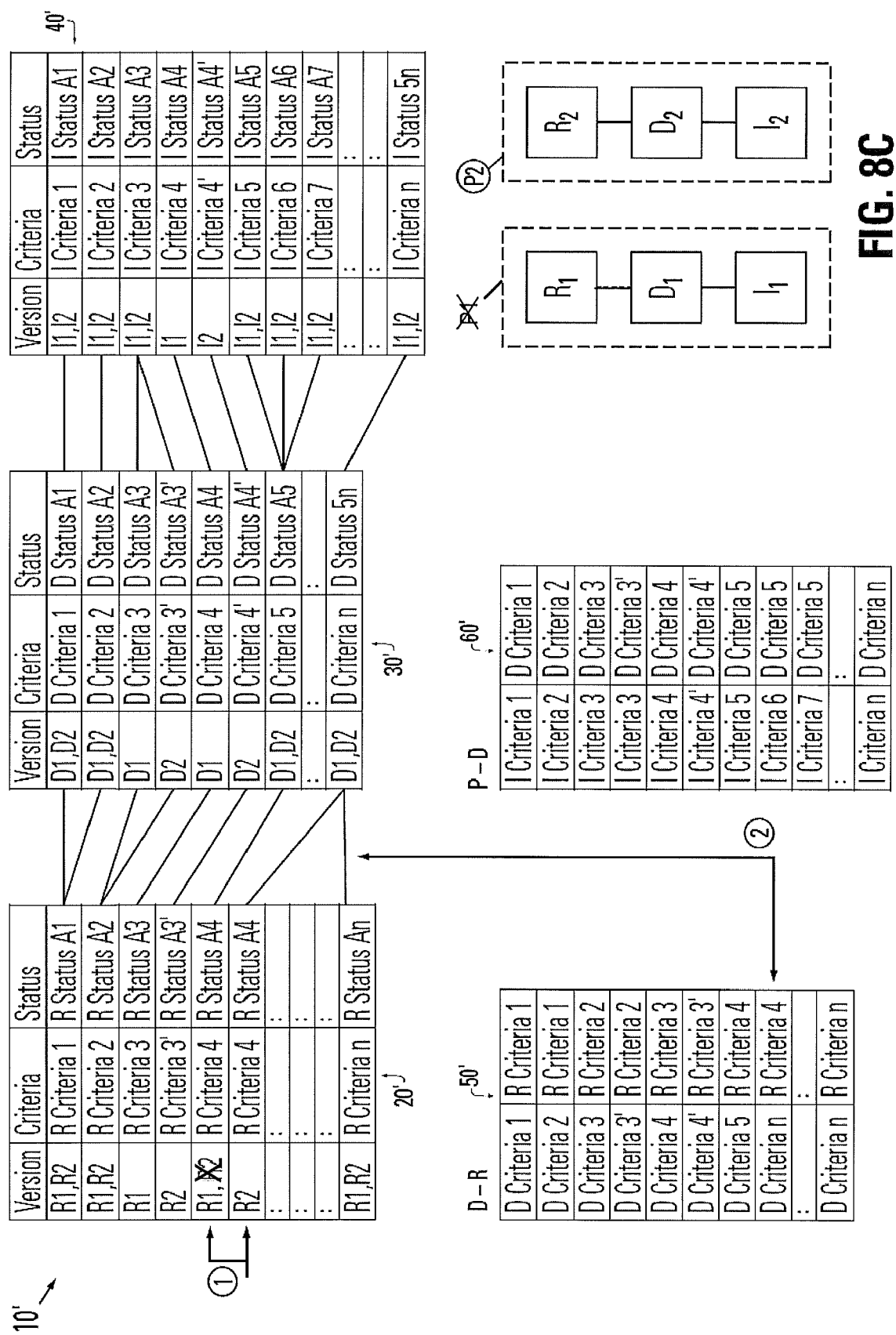

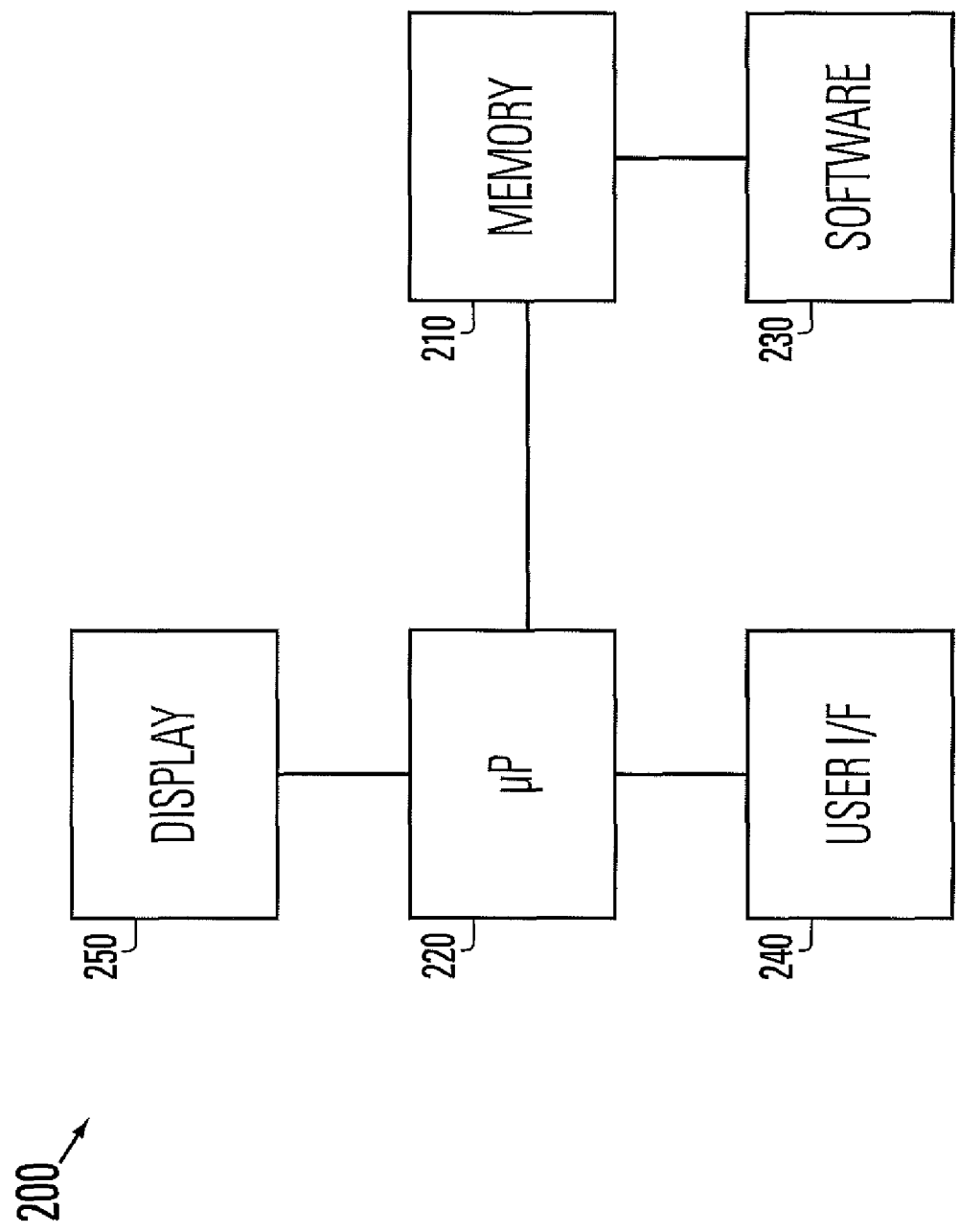

METHOD AND SYSTEM FOR MAINTAINING ENGINEERING PROJECT DOCUMENTATION

FIELD OF THE INVENTION

The present invention relates to configuration control. In particular, embodiments of the present invention relate to a method of configuration controlling a hierarchy of data arrays when providing a new version of those data arrays.

BACKGROUND OF THE INVENTION

In many engineering activities, a formalized approach to performing those activities is often adopted. For example, a requirements specification setting out the broad requirements of an engineering activity may be initially generated. These requirements may state the overall aims of the product or process to be delivered at the highest possible level of abstraction. To convert these requirements into a deliverable product, it is typically necessary to decrease the level of abstraction in layers until a characteristic or function of a tangible device has been defined. For example, it may be necessary to convert the requirements specification into one or more design specifications and then to convert each of these design specifications into one or more implementation specifications. In particular, one criterion within the requirements specification may generate one or more criteria within the design specification which in turn may generate one or more criteria within the implementation specification. Hence, a hierarchy of specifications may be generated with each criterion within those specifications being generated in response to criteria in other specifications. Each of these specifications can typically be expressed as a data array where each entry in the data array relates to a different criterion.

In order to provide some understanding of why each of the criteria within each of the specifications exists, it is useful to be able to link criteria within one level with criteria within another level. This can result in a one-to-one, many-to-one or one-to-many relationship between criteria in the different levels in the hierarchy. Accordingly, it will be appreciated that for even a modest engineering activity the number of criteria in each of the levels of the hierarchy and the linking between each of the criteria in each of the data arrays can soon become extremely complex and unmanageable.

This problem becomes particularly acute when different versions of specifications are used. Should different versions be utilised then not only do all the different criteria within arrays need to be managed, as do all the links between them, but also an understanding of how these vary with differing versions needs to be provided. It will be appreciated that the complexity can rapidly increase such that even if tools are used to assist in managing each of the criteria in the different versions of the different levels, as well as all the links between them, the situation can soon become unmanageable.

In one known technique which seeks to overcome this complexity problem, when using of different versions of these specifications a baselining process is employed whereby a particular set of versions of the specifications are frozen from time to time such as, for example, when a particular activity within the project life-cycle has been achieved. Hence, when a subsequent stage in the life-cycle commences which necessitates a change to the baselined specifications it is then typical for a copy of the baselined specifications to be generated which can then subsequently be changed as required.

It is desired to provide an improved technique for controlling the configuration of a hierarchy of data arrays.

SUMMARY OF THE INVENTION

According to a first aspect of the present invention there is provided a method of configuration controlling a hierarchy of data arrays, the method comprising the steps of: (i) defining a package of data arrays comprising a predetermined version of at least two data arrays in the hierarchy and in which at least one of the data arrays is to be updated to a new version based on a previous version, each data array in the hierarchy having at least one version, each version of each data array in the hierarchy being associated with one version of at least one other data array in the hierarchy, each data array comprising at least one data entry, each data entry comprising a plurality of fields, the plurality of fields comprising a version field and at least one characteristic field having a characteristic, the version field indicating which version of that data array the associated characteristic fields belong to; and (ii) appending a new version indicator indicative of the new version to each data entry having the previous version in the at least one of the data arrays.

The present invention recognises that a problem with the prior art baselining approach is that each time that a baselined document is to be changed, a new version needs to be created which necessitates that the baselined document is copied in some way in order that the changes can then be made. It will be appreciated that this copying creates a duplication of data whenever a new version is to be created.

However, in the present technique, no such copying is required. Instead, a package of data arrays is defined. The package includes at least two data arrays from within the hierarchy and at least one of those data arrays is to be updated to a new version. Defining a package in this way provides a context within which any modifications to the data arrays can be handled.

In any data array to be updated, a new version indicator is appended to each data entry to provide an indication that those data entries may belong to more than one version. It will be appreciated that by associating data entries with more than one version, the need to copy all the data entries within a data array to be updated is obviated. This in turn reduces the amount of additional data which needs to be created and can simplify the relationships between characteristics in different levels of the hierarchy.

In one embodiment, the step (ii) comprises appending the new version indicator indicative of the new version to the version field of each data entry having the previous version in the at least one of the data arrays.

Appending the new version indicator to the version field of each of the entries in the data array having the previous version provides a convenient mechanism by which those data entries may be associated with both a previous and a new version without the need to copy any data.

In one embodiment, the method further comprises the step of generating a link array, the link array comprising at least one link entry, each link entry linking a data entry in a lower data array in the hierarchy with a data entry in a higher data array in the hierarchy.

Providing a link array enables the characteristics of the data entry in one data array to be associated with the characteristics of the data entry in another data array. Typically, characteristics of the data entry in an array lower in the hierarchy will be associated with characteristics of the data entry in an array higher in the hierarchy.

In one embodiment, each link entry provides a first indication indicating the data entry in the lower data array and a second indication indicating the data entry in the higher data array.

Accordingly, it is possible to derive from the link table the relationship between different characteristics in each level in the hierarchy and which versions those characteristics belong to from the data arrays themselves. These links may link a unique identifier identifying a data entry in one data array with a unique identifier identifying a data entry in another data array or may link the characteristics within the characteristic fields themselves.

In one embodiment, each link entry comprises an indication of at least one package with which that link entry is associated.

Accordingly, the link array may also provide an indication of which package or packages a particular link belongs to. In this way, the need to refer to the data arrays in order to determine whether or not those criteria are relevant to a particular package and therefore to any particular version is obviated.

In one embodiment, the method further comprises the step of filtering out fields within data entries within the hierarchy of data arrays not associated with the package by excluding fields only associated with versions not defined by the package.

Accordingly, only those fields relevant to the current package are accessible.

In one embodiment, the method further comprises the step of filtering out characteristic fields within data entries within the hierarchy of data arrays not associated with the package by excluding data entries only associated with versions not defined by the package.

Accordingly, only those characteristics within data entries relevant to the current package are accessible.

In one embodiment, the method further comprises the step of in response to a selection of a selected characteristic field within a data entry within one of the hierarchy of data arrays in the package, determining with reference to the link array other data entries in the hierarchy of data arrays in the package with which the selected data entry is linked.

Accordingly, should a particular characteristic within a data entry in a data array be selected then it is possible to refer to the link array to determine which other characteristics in other data arrays are linked with that characteristic within the current package and from those links determine other links to other characteristics in other data arrays within the package. It will be appreciated that it is therefore possible to select any one particular characteristic and to rapidly determine all other characteristics linked to that characteristic within the current package. This provides a useful tool which enables these relationships to rapidly be understood.

In one embodiment, the method further comprises the step of in response to a request to include an additional characteristic within one of the hierarchy of data arrays in the package, including an additional data entry within that data array, the version field of the additional data entry having an indication of the new version of that data array specified by the package and the characteristic field including an indication of the additional characteristic.

Accordingly, only once an additional characteristic is to be included in one of the data arrays is an additional data entry made in that data array to enable the additional characteristics to be entered. The additional data entry having the additional characteristic is provided with a version field which indicates that that additional characteristic is associated with the new version of that data array specified by the package.

In one embodiment, the method further comprises the step of updating the link array to link the additional data entry with one of existing data entries and additional data entries within the hierarchy of data arrays in the package.

Accordingly, once the additional characteristic has been included then any links with new or current characteristics within other data arrays can be included in the link array.

In one embodiment, the method further comprises the step of in response to a request to alter a characteristic field within a data entry within one of the hierarchy of data arrays in the package, updating the version field of the data entry containing the characteristic to be altered to remove any indication of the new version of the one of the hierarchy of data arrays specified by the package and including an altered data entry within that data array, the version field of the altered data entry having an indication of the new version of the one of the hierarchy of data arrays specified by the package and the characteristic field of the altered data entry including an indication of the altered characteristic.

Hence, when an existing characteristic is to be altered it will be appreciated that because that characteristic is also used with a different version of the data array it is not appropriate to simply change that characteristic since this would otherwise impact on different packages which used the previous version of that data array. Instead, an identical entry in the data array is created so that two entries having the same characteristic initially exist and one of those entries is updated such that its version field relates to the new version of the data array and the other entry is amended to remove any reference to the new version from its version field. In this way, it will be appreciated that the characteristic can be maintained for other versions whilst it can also be updated to suit the new version.

In one embodiment, the method further comprises the steps of: identifying link entries associating the data entry to be altered and any other data entries within the hierarchy of data arrays in the package; adding to the link array link entries associating the altered data entry and each of the any other data entries within the hierarchy of data arrays in the package; and removing from the link array any link entries associating the data entry to be altered and any other data entries within the hierarchy of data arrays in the package.

Accordingly, link entries are also updated to take account of the alteration. The link entries for the data entry to be altered are identified. In particular, those link entries associated with other characteristics within the current package are identified. An additional link entry is added for each of the links which have been identified which associates the altered characteristic with the other characteristics within the data arrays. Any remaining link array entries which link the entry to be altered with other characteristics in the package are removed.

In embodiments, the method further comprises the steps of in response to a request to link a data entry in one data array with another data entry in another data array within the package, the data entry and the another data entry each belonging to at least one other common package, updating the version field of the data entry to remove any indication of the new version specified by the package and including an additional data entry within that data array, the version field of the additional data entry having an indication of the new version specified by the package and the characteristic field of the additional data entry including being identical to that of the data entry.

In embodiments, the method further comprises the step of adding to the link array link a link entry associating the additional data entry and the another data entry.

Accordingly, all links belong unambiguously to the intended packages.

In one embodiment, the method further comprises the step of in response to a request to delete a data entry within one of the hierarchy of data arrays in the package, updating the version field of the entry to remove any indication of the new version specified by the package.

Hence, when a characteristic is to be deleted from one of the data arrays the version field of that entry is updated by removing the indication of the new version from the version field. In this way that characteristic is effectively deleted from that version of the data array although the characteristic itself may be retained since this characteristic may be used in other versions.

In one embodiment, the method further comprises the step of removing from the link array any entries associating the deleted data entry and any other data entries within the hierarchy of data arrays which are not within any package.

Accordingly, should a characteristic be deleted then the associated links may be deleted should they not be associated with any known package.

In one embodiment, the method further comprises the step of removing any data entries within the hierarchy of data arrays which are not within any package.

Accordingly, should a characteristic be deleted then the associated entry may be deleted should it not be associated with any known package.

In one embodiment, the plurality of fields comprises a status field.

Hence, the data entries may not only just contain characteristic information but may also contain status information relating to that characteristic. For example, the status field may contain management information such as information relating to a test regime to validate the existence or performance of that characteristic or the status field may contain rationale information such as information indicative of why that characteristic links with other characteristics.

In one embodiment, the method further comprises the step of in response to a request to alter a status field of a data entry within one of the hierarchy of data arrays in the package, replicating that status field to be altered to create a replicated status field for each entry in that data array, indicating that the replicated status field is associated with the new version by associating the replicated status field with the new version and indicating that the status field to be altered is associated with the previous version by associating the status field to be altered with the previous version.

Hence, when a request is received to alter a status field then a further status field is created for each entry in that data array and the data from the original status field is replicated into that replicated status field. The original status field is then un-associated with the new version, whilst the replicated status field is associated with the new version. Accordingly, it will be appreciated that this enables different status fields to be used for different versions without the need to duplicate the complete data array each time a status field is changed.

In one embodiment, the method further comprises the step of filtering out status fields within data entries within the hierarchy of data arrays not associated with the package by excluding status fields only associated with versions not defined by the package.

Accordingly, only those status fields within data entries relevant to the current package are accessible.

In one embodiment, each data array comprises a table of data entries, each row of the table being one of the data entries and each column of the table being one of the plurality of fields.

Hence, the data array may take the form of a table. In one embodiment, at least one characteristic field contains information representing an ordering of the data entries.

Accordingly, changes in the ordering of criteria within different versions can also be determined.

In one embodiment, each status field contains information representing a management attribute associated with that data entry.

These management attributes may comprise test result information, rationale information, and version information.

In one embodiment, the method comprises the step of storing information indicating a relationship between the new version and the previous version.

Accordingly, it is possible to determine the relationship between the different versions of the data arrays.

In one embodiment, the information comprises a version tree indicating the relationship between any new versions and any previous versions.

Accordingly, a version tree may be provided in which an original version may be provided as a root note, with subsequent versions being provided as child notes.

In one embodiment, the step (i) comprises: defining a package of data arrays comprising a predetermined version of at least two data arrays in the hierarchy and in which at least one of the data arrays is to be updated to a temporary version based on a previous version and the step (ii) comprises: appending a temporary version field to each data entry in the at least one of the data arrays.

Accordingly, rather than generating a completely new version it is possible to provide a temporary version in order to examine the impact of any changes within the data arrays prior to committing to those changes.

A temporary version field is appended to each data entry in the arrays to be updated and this may be utilised when making the temporary changes. In this way, it will be appreciated that once again the need to duplicate the data arrays is obviated whilst enabling temporary changes to be made which could easily be discarded in the event that those changes are not required.

In one embodiment, the method further comprises the step of generating a link array, the link array comprising at least one link entry, each link entry linking a data entry in a lower data array in the hierarchy with a data entry in a higher data array in the hierarchy.

In one embodiment, each link entry provides a first indication indicating the data entry in the lower data array and a second indication indicating the data entry in the higher data array.

In one embodiment, each link entry comprises an indication of at least one package with which that link entry is associated.

In one embodiment, the method further comprises the step of filtering out fields in the hierarchy of data arrays not associated with the package by excluding fields only associated with versions not defined by the package.

In one embodiment, the method further comprises the step of filtering out characteristic fields within data entries within the hierarchy of data arrays not associated with the package by excluding data entries only associated with versions not defined by the package.

In one embodiment, the method further comprises the step of in response to a selection of a selected characteristic field within a data entry within one of the hierarchy of data arrays in the package, determining with reference to the link array other data entries in the hierarchy of data arrays in the package with which the selected data entry is linked.

In one embodiment, the method further comprises the step of in response to a request to include an additional characteristic within at least one of the hierarchy of data arrays in the package, including an additional data entry within that data array, the version field of the additional data entry having an indication of the temporary version of that data array specified by the package and the characteristic field of the additional data entry including an indication of the additional characteristic.

Hence, when including an additional characteristic within a data array an additional entry is made within that array and the version field is annotated to indicate that the characteristic is associated with the temporary version.

In one embodiment, the method further comprises the step of updating the link array to link the additional data entry with one of existing data entries and additional data entries within the hierarchy of data arrays in the package.

Hence, the link array is updated to link the additional characteristic with any other characteristics within the hierarchy of data arrays within the package.

In one embodiment, the method further comprises the step of in response to a request to alter a field within a data entry within at least one of the hierarchy of data arrays in the package, updating the temporary new version field of the data entry to be altered to provide an indication of the temporary version specified by the package and including an altered data entry within that data array, the version field of the altered data entry having an indication of the temporary version specified by the package and the field of the altered data entry including an indication of the altered field.

Hence, when a field is to be temporarily altered, the temporary new version field of the entry which is being altered is annotated to indicate that a temporary new version of this entry has been created and an altered entry is created within the data array which has an indication of the temporary version within the version field of that entry.

In embodiments, the request is to alter one of a characteristic field and a status field.

Hence, the same technique can be used when altering either characteristic or status fields.

In one embodiment, the method further comprises the steps of: identifying link entries associating the data entry to be altered and any other data entries within the hierarchy of data arrays in the package; and adding to the link array link entries associating the altered data entries and each of the any other data entries within the hierarchy of data arrays in the package.

Accordingly, any link entries which are associated with the entry which has been altered are determined and those link entries which are valid within the current package are duplicated to associate the altered characteristic with the other characteristics which were identified.

In one embodiment, the method further comprises the step of in response to a request to delete a data entry within one of the hierarchy of data arrays in the package, updating the new version field of the data entry to be deleted to provide an indication of the temporary version specified by the package.

Hence, when deleting a characteristic, the new version field of the entry to be deleted is updated to indicate that this characteristic is no longer part of that version.

In one embodiment, the method further comprises the step of in response to a request to recreate the package by converting the temporary version to a permanent new version, appending a new version indicator indicative of the permanent new version to the version field of each data entry having the previous version in the at least one of the data arrays and not having an entry in its new version field, and replacing any new version indicators within the version field with a new version indicator indicative of the permanent new version.

Hence, when accepting all of the temporary changes made within the temporary new version, the package is then converted into a permanent new version. Two actions then occur. Any new version indicators within the version field are replaced with a new version indicator which indicates the permanent new version. Also, wherever the previous version is included in the version field then these are updated to add the permanent new version unless there is an indication in the new version field which means that either that characteristic has been altered or deleted and so should not be included in the permanent new version In one embodiment, the method further comprises the step of in the event that for any data entry more than one temporary version is indicated in the temporary version field, performing a step of identifying a possible incompatibility.

In one embodiment, the step of identifying a possible incompatibility comprises determining whether the more than one temporary versions relate to alterations within different fields and, if so, merging the alterations when converting the temporary version to a permanent new version.

In one embodiment, the step of identifying a possible incompatibility comprises determining whether the more than one temporary versions relate to alterations within common fields and, if so, indicating that an incompatibility between temporary versions has occurred.

According to a second aspect of the present invention there is provided a computer program operable when executed on a computer to perform the steps of: (i) defining a package of data arrays comprising a predetermined version of at least two data arrays in the hierarchy and in which at least one of the data arrays is to be updated to a new version based on a previous version each data array in the hierarchy having at least one version, each version of each data array in the hierarchy being associated with one version of at least one other data array in the hierarchy, each data array comprising at least one data entry, each data entry comprising a plurality of fields, the plurality of fields comprising a version field and at least one characteristic field having a characteristic, the version field indicating which version of that data array the associated characteristic fields belong to; and (ii) appending a new version indicator indicative of the new version to each data entry having the previous version in the at least one of the data arrays.

According to a third aspect of the present invention there is provided a data processing apparatus comprising means for defining a package of data arrays comprising a predetermined version of at least two data arrays in the hierarchy and in which at least one of the data arrays is to be updated to a new version based on a previous version each data array in the hierarchy having at least one version, each version of each data array in the hierarchy being associated with one version of at least one other data array in the hierarchy, each data array comprising at least one data entry, each data entry comprising a plurality of fields, the plurality of fields comprising a version field and at least one characteristic field having a characteristic, the version field indicating which version of that data array the associated characteristic fields belong to; and means for appending a new version indicator indicative of the new version to each data entry having the previous version in the at least one of the data arrays.

According to a fourth aspect of the present invention there is provided a method of version controlling an array of data entries, the method comprising the steps of: in response to a request to generate a new version of the array of data entries in which at least part of the array of data entries is to differ from a previous version and in which each data entry comprising a plurality of fields, the plurality of fields comprising a version field, at least one characteristic field and at least one status field, appending a new version indication to each data entry having the previous version indicated in its version field; and (i) in case the original at least part of a data entry is a characteristic field of a data entry, replicating that original data entry to create a replicated data entry which includes the new at least part of a data entry, indicating that the replicated the data entry is associated with the new version and indicating that the original data entry is associated with the previous version, (ii) in case the original at least part of a data entry is a status field of a data entry, generating a replicated status field from that original status field, the replicated status field including the new at least part of a data entry, indicating that the replicated the status field is associated with the new version and indicating that the original status field is associated with the previous version.

In one embodiment, the array of data entries comprises a table of data entries, each row of the table being one of the data entries and each column of the table being one of the plurality of fields.

In one embodiment, the step (i) comprises: in case the original at least part of a data entry is a characteristic field of a data entry, replicating that original data entry to create the replicated data entry in a new row of the table, the new at least part of a data entry being included in the replicated data entry in the new row of the table, indicating that the replicated the data entry is associated with the new version by updating the version field of the new row of the table to indicate the new version and indicating that the original data entry is associated with the previous version by updating the version field of a row containing the original data entry to indicate the previous version.

In one embodiment, the step (ii) comprises: in case the original at least part of a data entry is a status field of a data entry, replicating that original status field to create the replicated status field in the same row of the table, the new at least part of a data entry being included in the replicated status field in that same row of the table, indicating that the replicated the status field is associated with the new version by associating the replicated status field of that the same row of the table to indicate the new version and indicating that the original status field is associated with the previous version by associating the original status field of that the same row of the table to indicate the previous version.

In one embodiment, each status field contains information representing a management attribute associated with that data entry.

In one embodiment, the method comprises the step of: storing information indicating a relationship between the new version and the previous version.

In one embodiment, the information comprises a version tree indicating the relationship between any new versions and any previous versions.

In one embodiment, the array comprises a container including at least one version of data entries.

According to a fifth aspect of the present invention there is provided a computer program operable, when executed on a computer, to perform the steps of: in response to a request to generate a new version of the array of data entries in which at least part of the array of data entries is to differ from a previous version and in which each data entry comprising a plurality of fields, the plurality of fields comprising a version field, at least one characteristic field and at least one status field, appending a new version indication to each data entry having the previous version indicated in its version field; identifying an original at least part of a data entry in the previous version which is to differ from a new at least part of a data entry in the new version and (i) in case the original at least part of a data entry is a characteristic field of a data entry, replicating that original data entry to create a replicated data entry which includes the new at least part of a data entry, indicating that the replicated data entry is associated with the new version and indicating that the original data entry is associated with the previous version, (ii) in case the original at least part of a data entry is a status field of a data entry, generating a replicated status field from that original status field, the replicated status field including the new at least part of a data entry, indicating that the replicated status field is associated with the new version and indicating that the original status field is associated with the previous version.

According to a sixth aspect of the present invention there is provided a data processing apparatus comprising means, responsive to a request to generate a new version of the array of data entries in which at least part of the array of data entries is to differ from a previous version and in which each data entry comprising a plurality of fields, the plurality of fields comprising a version field, at least one characteristic field and at least one status field, appending a new version indication to each data entry having the previous version indicated in its version field, for identifying an original at least part of a data entry in the previous version which is to differ from a new at least part of a data entry in the new version and (i) in case the original at least part of a data entry is a characteristic field of a data entry, for replicating that original data entry to create a replicated data entry which includes the new at least part of a data entry, indicating that the replicated the data entry is associated with the new version and indicating that the original data entry is associated with the previous version, (ii) in case the original at least part of a data entry is a status field of a data entry, for generating a replicated status field from that original status field, the replicated status field including the new at least part of a data entry, indicating that the replicated the status field is associated with the new version and indicating that the original status field is associated with the previous version.

BRIEF DESCRIPTION OF THE DRAWINGS

The present invention will be described further, by way of example only, with reference to embodiments thereof as illustrated in the accompanying drawings in which:

FIG. 1 shows an example hierarchy of data arrays;

FIG. 2 shows a hierarchy of data arrays and associated packages;

FIGS. 3A to 3F illustrate two main techniques used when updating a data array;

FIG. 5 illustrates the deletion of an existing criterion according to the first technique;

FIGS. 6A to 6E illustrate the alteration of an existing criterion according to the second technique;

FIG. 8B illustrates a hierarchy of data arrays and their associated link tables according to another embodiment;

FIG. 8C illustrates adding a link to the data arrays and their associated link tables according of FIG. 8A;

FIG. 10 illustrates a data processing apparatus according to embodiments.

DESCRIPTION OF THE EMBODIMENTS

Figure 4:
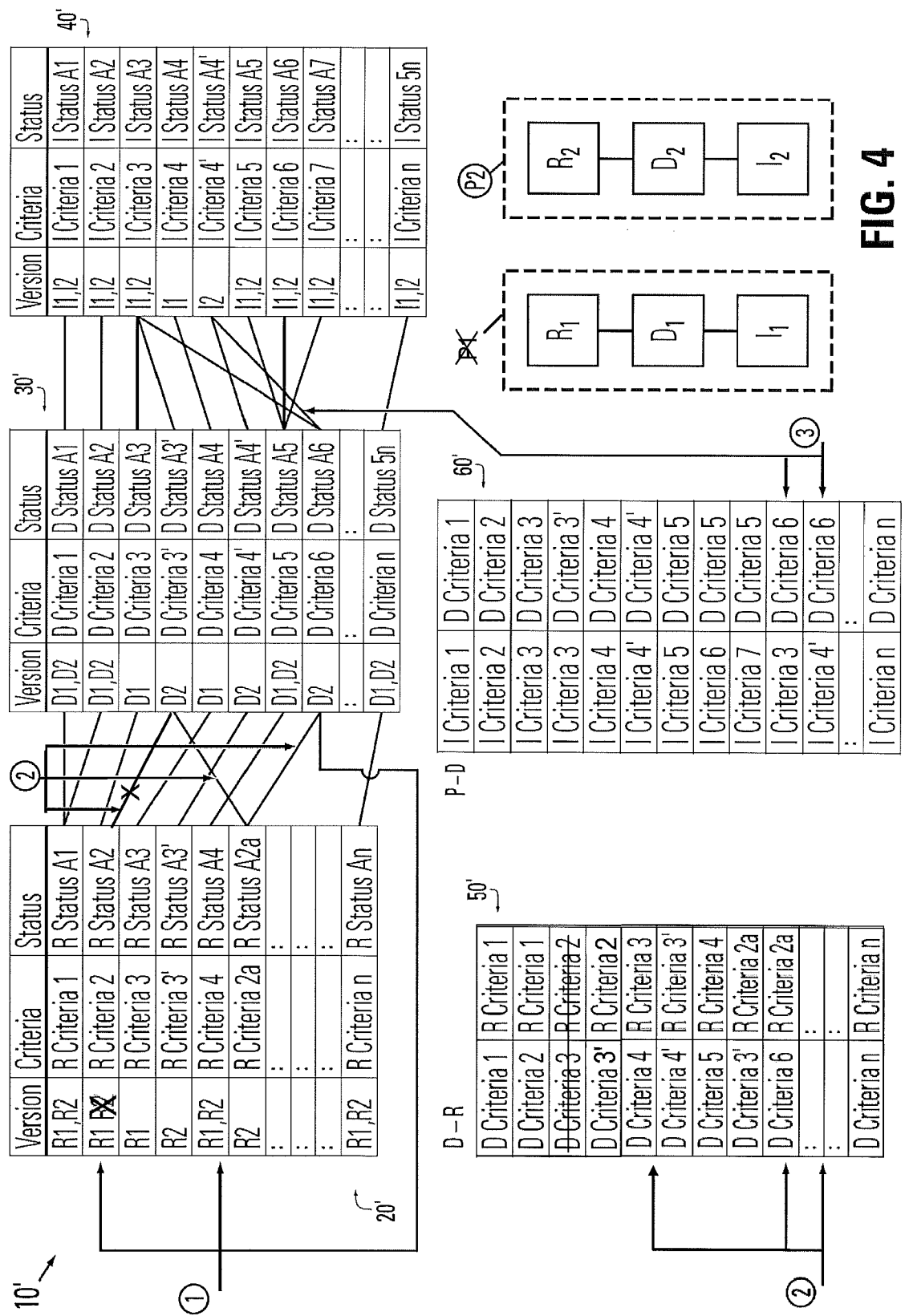
FIG. 4 illustrates the alteration of an existing criterion according to the first technique.

In order to help better understand the issues involved in configuration management in an engineering environment a typical project evolution is illustrated in FIG. 1 which shows an example hierarchy of data arrays, generally 10, according to one embodiment. This hierarchy of data arrays 10 comprises three levels of data arrays, however, it will be appreciated that any number of levels may be provided. At the uppermost level is a requirements data array 20. In the next level and stemming from the requirements data array 20 is a design data array 30. In the lowest level and stemming from the design data array 20 is an implementation data array 40. This hierarchical arrangement is typically used in complex engineering projects where the requirements data array 20 sets the main overall requirements, goals and objectives of the project, with the design data array 30 being a lower level of abstraction in which some of the design criteria or features which will fulfil those upper level requirements are specified, and with the implementation data array 40 being a yet lower level of abstraction in which the specific detailed implementation criteria which achieve the design criteria are specified.

Hence, initially, a first version R1 of the requirements data array 20 may be specified. Thereafter, a first version D1 of the design data array 30 which satisfies those requirements may be defined. Thereafter, a first version I1 of the implementation data array 40 may be defined which satisfies the design. Each of these data arrays will typically comprise more than one criterion.

In order to understand the relationship between the different data arrays in the hierarchy 10 it is possible to link criteria. For example, it is possible to link criteria within the requirements data array 20 with the criteria within the design data array 30 which fulfil those criteria. These links may be a one-to-one, one-to-many or many-to-one relationship. Similarly, for each criterion in the design data array 30 it is possible to link with the criteria in the implementation data array 40 which satisfy that criterion. Hence, even with just one version of data arrays in the hierarchy 10 there are already a great deal of inter-related links and information.

In the event that an alternative to first version I1 of the implementation data array 40 is to be generated, a new version I2 of the implementation data array 40 is created. This new version I2 of the implementation data array 40 will typically be based on a previous version of the implementation data array such as I1.

Similarly, in the event that an alternative to the first version D1 of the design data array 20 is to be generated, then this new version D2 of the design data array 30 is created, which may be based initially on the first version D1. In the event that a new version I3 of the implementation data array 40 needs to be generated, then this new version I3 implementation I3 may be generated. Again, this new version I3 may be based initially on a previous version, in this example I2.

Should the requirements change then a new version R2 of the requirements data array 20 may be generated, which may be based upon version R1. In response to the new version R2 of the requirements data array 20 then a new version D2 of the design data array 30 may be generated, in this case based on the design version D1. It may be that the new version D2 of the design data array 30 can still be fully implemented using the version I3, but subsequently a new implementation version I4 is arrived at.

As can be seen, even in this somewhat simplistic example, multiple relationships can exist between the levels in the hierarchy 10 and these relationships and criteria will change as the versions of those levels are altered.

To help deal with this complexity the concept of a package is used which defines a relationship between versions of the levels in the hierarchy 10 in order to assist in the decision making about how to handle changes to those versions and the consequential impact on any links. This is illustrated in more details in FIG. 2, which shows a hierarchy of data arrays and associated packages.

When a version of each data array in the hierarchy 10 is first generated it is assigned to a package, for example, P1. Package P1 in this example will comprise version R1 of the requirements data array 20, version D1 of the design data array 30 and version I1 of the implementation data array 40. As the project evolves and necessitates a new version I2 of the implementation data array 40 then a new package, P2 is defined which includes version R1, version D2 and the new version I2, which is based on the previous version I1 of the implementation data array 40. Although in this example just one level in the hierarchy has been updated to a new version it may be that more than one level in the hierarchy is to be updated to a new version at the same time. For example, in package P3 both the version of the design data array 30 changes from D1 to D2 and the version of the implementation data array 40 changes to I2 to I3, whilst the requirements data array 20 remains at version R1. Also, packages may comprise versions of data arrays which are not from every level in the hierarchy 10, such as package P6 which contains version D1 and version I2, whilst package P7 contains version R2 and version D3.

FIGS. 3A to 3F illustrate two main techniques used when updating a data array. FIG. 3A illustrates an example requirements data array 20'. The requirements data array 20' has a number of entries. Each entry has a version field, a characteristic field and a status field. Each of the criteria of the requirements is generally specified in a different entry in the data array although more than one criterion may be included within each entry, if required. The criteria in the criteria fields define an individual aspect of the requirements. The version field provides an indication of which versions that criterion is associated with. In this case all the criteria are currently associated with version R1. In the status field an indication of a status is provided. The status field may indicate any number of processes or activities such as whether the criterion has been implemented in a lower level data array or whether sufficient testing has been performed to validate that that requirement criterion has been met.

In the event that it is intended to update the requirements data array to a new version then two different techniques may be adopted to achieve this and these are illustrated in FIGS. 3B and 3E.

In the first approach, as illustrated FIG. 3B, when updating the data array to version R2, where version R2 is based upon version R1, an identifier R2 is appended to every entry in the version field of the data array which already has an R1 identifier. In this way, a new version of the data array is created without the need to duplicate all of that data array.

FIG. 3C illustrates how then a change to one of the criterion within the data array 20' occurs. For example, consider that R criteria 3 is to be changed in version R2. To achieve this the version identifier R2 is deleted from the entry associated with R criteria 3, a new entry is created with the amended entry R criteria 3' and the version field for this entry is annotated with version R2. The R status A3 content may also be duplicated into this new entry in its original or an amended form.

Similarly, as shown in FIG. 3D, in the event that a new status field is to be added then a further field is generated for each entry and this is associated with version R2, whilst the original status field is annotated to be associated with version R1.

In the second approach, as illustrated in FIG. 3E, a new version field is added to every entry in the data array. This new version field can be used in combination with annotations within the version field to create temporary changes to the data array which may be easily reversed prior to committing to formerly generating a new version.

FIG. 3F illustrates the data array when a change is to be made to R criteria 2. As can be seen, an indication is made in the new version field to show that R criteria 2 is not to be included in any new version. However, a new entry is made which includes the amended R criteria 2' and an indication is made in the version field that this criterion is to be included in a new version.

In either event, it can be seen that the amount of duplication of data entries is minimized to only that necessary. It will be appreciated that this provides for a significant reduction in data size for even a modest engineering activity.

FIG. 4 illustrates the alteration of an existing criteria according to the first technique in more detail. The currently selected package is package P2. R2 is based on R1, D2 is based on D1 and I2 is based on I1. Accordingly, each occurrence of R1 has already been annotated to include R2, each occurrence of D1 has already been annotated to include D2 and each occurrence of I1 has already been annotated to include I2. A number of changes to these new versions has already been made and it is now desired to alter R criteria 2 in package P2.

However, R criteria 2 is not solely utilised by the current package and so if this criterion was simply changed then it would affect packages which used other versions. Accordingly, in a first step, the reference to requirements R2 is deleted from the version field associated with R criteria 2. A new entry is made in the requirements table and the content of the R criteria 2 and R status A2 is copied to that new entry, these are then updated to R criteria 2a and R status 2a with the version field indicating R2. Hence, the original criterion is retained and associated with requirements R1 whereas the new criteria, R criteria 2a is included in the table and associated with version R2. Also, the new R criteria 2a cannot be satisfied with the current criteria in the design data array and so a new design criteria, D criteria 6 is included. Next, in the second step, any links between the R criteria 2 and other criteria within the same package are identified. In this case a link with D criteria 3' is identified and this link is deleted from the link table since R criteria 2 should now only link with D criteria 3. The deleted link is then reformed between R criteria 2a and D criteria 3'. A link is made between R criteria 2a and D criteria 6 and this is included in the link table. In this example, D criteria 6 can be satisfied with existing criteria within the implementation data array and so a link is formed with those criteria, in this case I criteria 3 and I criteria 4', and this is also included in the link table.

Hence, it can be seen that current criteria can be simply altered and the links systematically updated without affecting the content in the other packages.

Similarly, should a criterion need to be deleted from a data array in the current package then this is effected by simply deleting the reference to that version in the version field, as illustrated in FIG. 5. It will be appreciated that this can be achieved without actually deleting the criterion from the data array. However, housekeeping functions could be used to remove un-referenced criterion and unreferenced links should that be required.

FIG. 6A illustrates in more detail the second technique for updating a data array. In this example, the current package is P2 which is to be updated at some point to a new version. As can be seen from FIG. 6A each of the data arrays to be updated have a new version field appended thereto. In this example, R criteria 2 is intended to be updated in the new version. Accordingly, initially R criteria 2 has an entry made in the new version field to indicate that this criterion should not be included in any subsequent update to a new version. Also, the amended R criteria 2 is copied to a new entry within the requirements data array 20" together with its status field and both of these may be updated. Also, the new entry is annotated in the version field to indicate that this is a change which ought to be included in any update to a new version. Additionally, because the change in criterion cannot be met by existing criteria within the design data array 30" D criteria 6 is added to the array and is annotated in the version field to indicate that this should be included in any new version. Next the link tables 50' and 60' are updated to link R criteria 2A with the links within the same package of the criterion which has been altered (in this case a link is made with D criteria 3' which originally linked with R criteria 2 in the current package). Also, a link is made with D criteria 6. In addition, link table 60' is updated to link with criteria in the current package which implement this design criteria, in this case, I criteria 3 and I criteria 4'. In this way, it can be seen that existing criteria can simply and easily be updated without the need to duplicate all of the entries within the data arrays to be updated.

Figure 6B:
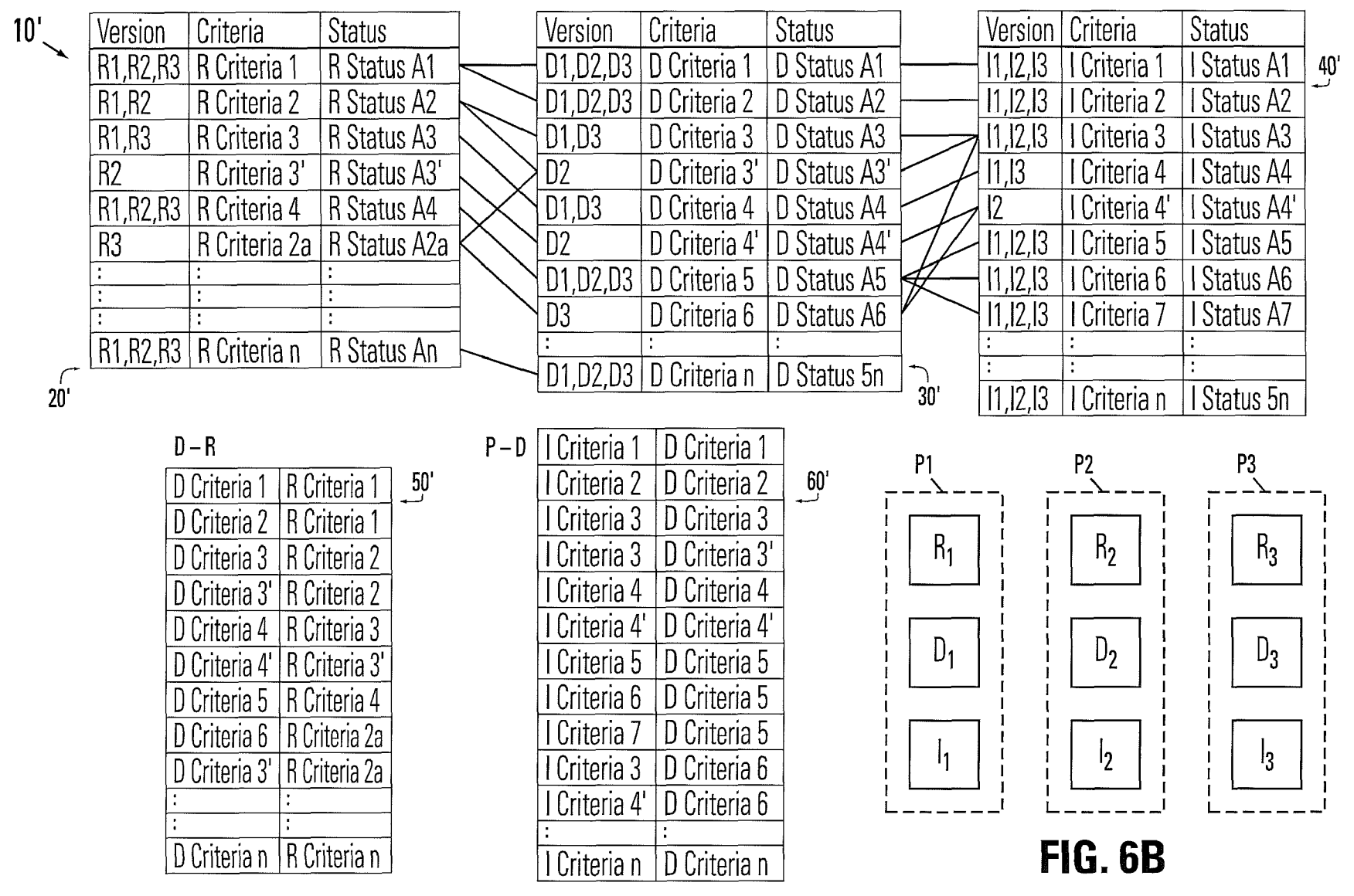

FIG. 6B shows the changes made to the data arrays once the changes have been accepted. The new version of the data arrays is to be based on package P2. Hence, every instance of R2, D2 or 12 is annotated in the version field with version R3, except for any entries which have an indicator in the new version field. Also, any instances of CR1 in the version field is updated to the new version for that array.

Figure 6C:
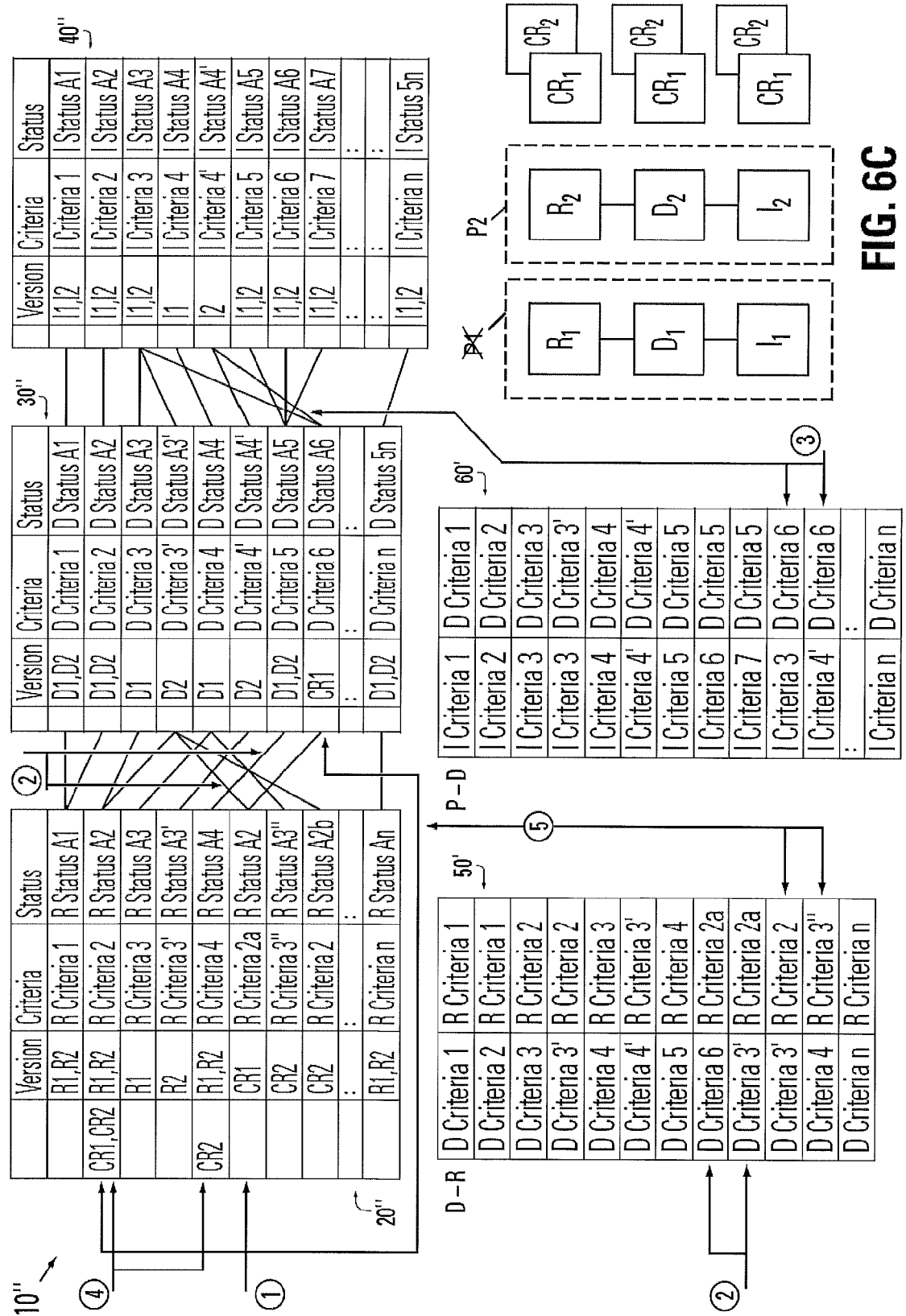

FIG. 6C illustrates an example where multiple temporary versions CR1 and CR2 of the current package P2 are generated which are to be updated at some point to a new version. In this example, two temporary new versions are generated, but it will be appreciated more than two may be generated and that more than one user may be simultaneously modifying the data arrays.

As can be seen from FIG. 6C each of the data arrays to be updated have a new version field appended thereto. In this example, R criteria 2 is intended to be updated in the new version. Accordingly, initially R criteria 2 has an entry CR1 made in the new version field to indicate that this criterion should not be included in any subsequent update to a new version. The amended R criteria 2 is copied to a new entry within the requirements data array 20" together with its status field and both of these may be updated. Also, the new entry is annotated with CR1 in the version field to indicate that this is a change which ought to be included in any update to a new version. Additionally, because the change in criterion cannot be met by existing criteria within the design data array 30" D criteria 6 is added to the array and is annotated in the version field with CR1 to indicate that this should be included in any new version. Next the link tables 50' and 60' are updated to link R criteria 2A with the links within the same package of the criterion which has been altered (in this case a link is made with D criteria 3' which originally linked with R criteria 2 in the current package). Also, a link is made with D criteria 6. In addition, link table 60' is updated to link with criteria in the current package which implement this design criteria, in this case, I criteria 3 and I criteria 4'.

Also, in this example, R criteria 2 is intended to be updated in another way in the new version, as is R Criteria 3'. Accordingly, R criteria 2 has an entry CR2 made in the new version field to indicate that this criterion should not be included in any subsequent update to a new version. Also, R criteria 2 is copied to a new entry within the requirements data array 20" together with its status field and both of these may be updated. In this example, only the status field is updated to R Status 2*b*. Also, the new entry is annotated with CR2 in the version field to indicate that this is a change which ought to be included in any update to a new version. Additionally, because the change in criterion can be met by existing criteria within the design data array 30" the link tables 50' and 60' are updated to link R criteria 2 with the links within the same package of the criterion which has been altered (in this case a link is made with D criteria 3' which originally linked with R criteria 2 in the current package).

Also, R criteria 3' has an entry CR2 made in the new version field to indicate that this criterion should not be included in any subsequent update to a new version. R criteria 3' is copied to a new entry within the requirements data array 20" together with its status field and both of these may be updated. In this example, only the characteristic field is updated to R Status 3". Also, the new entry is annotated with CR2 in the version field to indicate that this is a change which ought to be included in any update to a new version. Additionally, because the change in criterion can be met by existing criteria within the design data array 30" the link tables 50' and 60' are updated to link R criteria 3" with the links within the same package of the criterion which has been altered (in this case a link is made with D criteria 4 which originally linked with R criteria 3' in the current package). In this way, it can be seen that existing criteria can simply and easily be updated without the need to duplicate all of the entries within the data arrays to be updated.

FIG. 6D shows the changes made to the data arrays once the changes have been accepted. In this example, no conflicts exist between the different changes requested in the new version, which is to be based on package P2. Hence, every instance of R2, D2 or I2 is annotated in the version field with version R3, except for any entries which have an indicator in the new version field. Also, any instances of CR1 or CR2 in the version field is updated to the new version for that array.

Figure 6E:
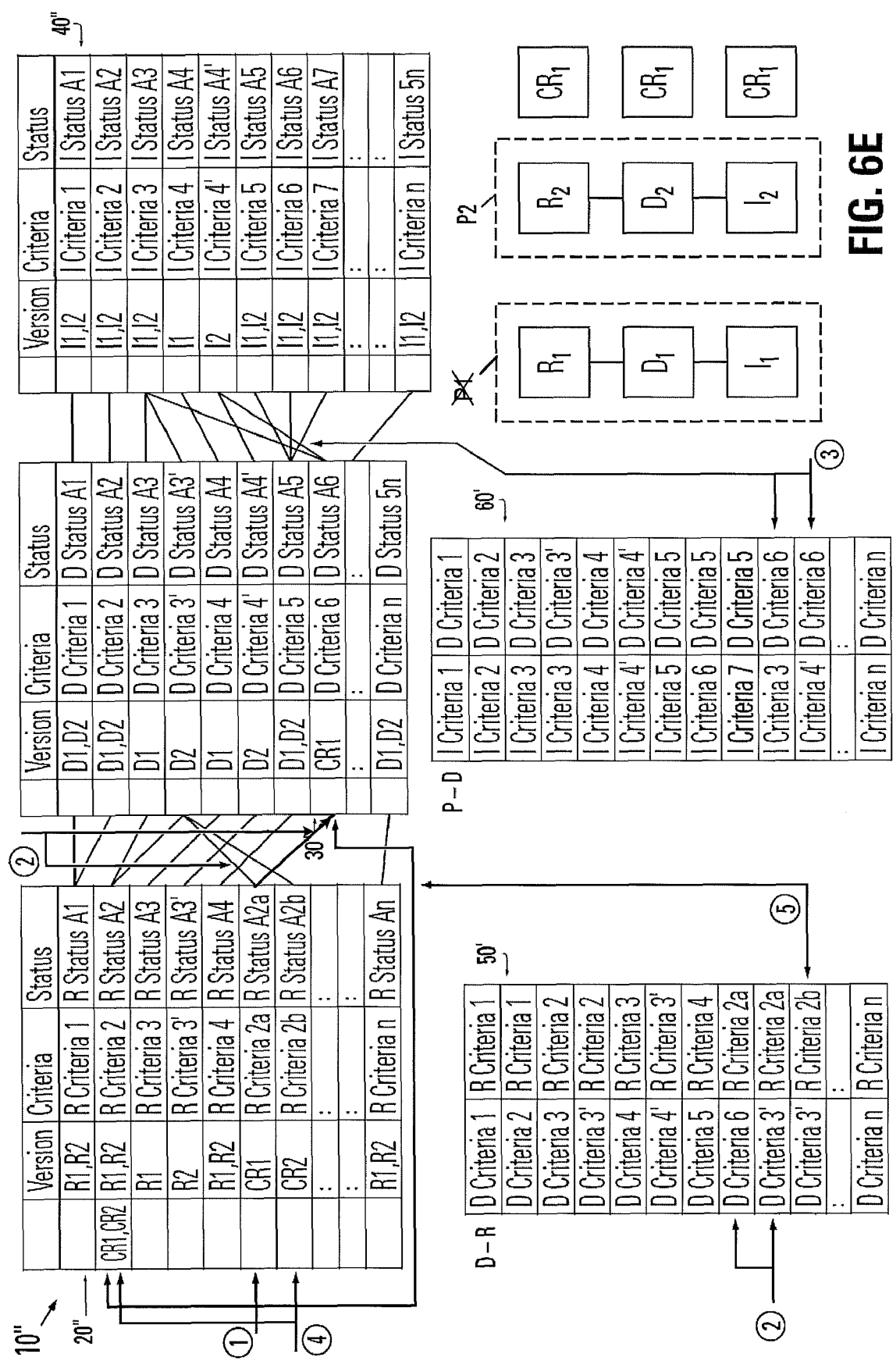

FIG. 6E illustrates a situation were a conflict occurs due to the same criterion being updated in different ways by different temporary versions. As can be seen from FIG. 6E each of the data arrays to be updated have a new version field appended thereto. In this example, R criteria 2 is intended to be updated in the new version. Accordingly, initially R criteria 2 has an entry CR1 made in the new version field to indicate that this criterion should not be included in any subsequent update to a new version. Also, R criteria 2 is copied to a new entry within the requirements data array 20" together with its status field and both of these may be updated. In this example, only the characteristic field is updated to R Criteria 2*a*. Also, the new entry is annotated with CR1 in the version field to indicate that this is a change which ought to be included in any update to a new version. Additionally, because the change in criterion cannot be met by existing criteria within the design data array 30" D criteria 6 is added to the array and is annotated in the version field with CR1 to indicate that this should be included in any new version. Next the link tables 50' and 60' are updated to link R criteria 2*a* with the links within the same package of the criterion which has been altered (in this case a link is made with D criteria 3' which originally linked with R criteria 2 in the current package). Also, a link is made with D criteria 6. In addition, link table 60' is updated to link with criteria in the current package which implement this design criteria, in this case, I criteria 3 and I criteria 4'.

Also, in this example, R criteria 2 is intended to be updated again by a different temporary version. Accordingly, R criteria 2 has an entry CR2 made in the new version field to indicate that this criterion should not be included in any subsequent update to a new version. Also, R criteria 2 is copied to a new entry within the requirements data array 20" together with its status field and both of these may be updated. In this example, only the characteristic field is updated to R Criteria 2*b*. The new entry is annotated with CR2 in the version field to indicate that this is a change which ought to be included in any update to a new version. Additionally, because the change in criterion can be met by existing criteria within the design data array 30" the link tables 50' and 60' are updated to link R criteria 2 with the links within the same package of the criterion which has been altered (in this case a link is made with D criteria 3' which originally linked with R criteria 2 in the current package).

However, because the same field is updated by two different changes an indication is provided of an incompatibility between temporary versions which needs to be resolved before an update to the new version can take place.

Figure 7:
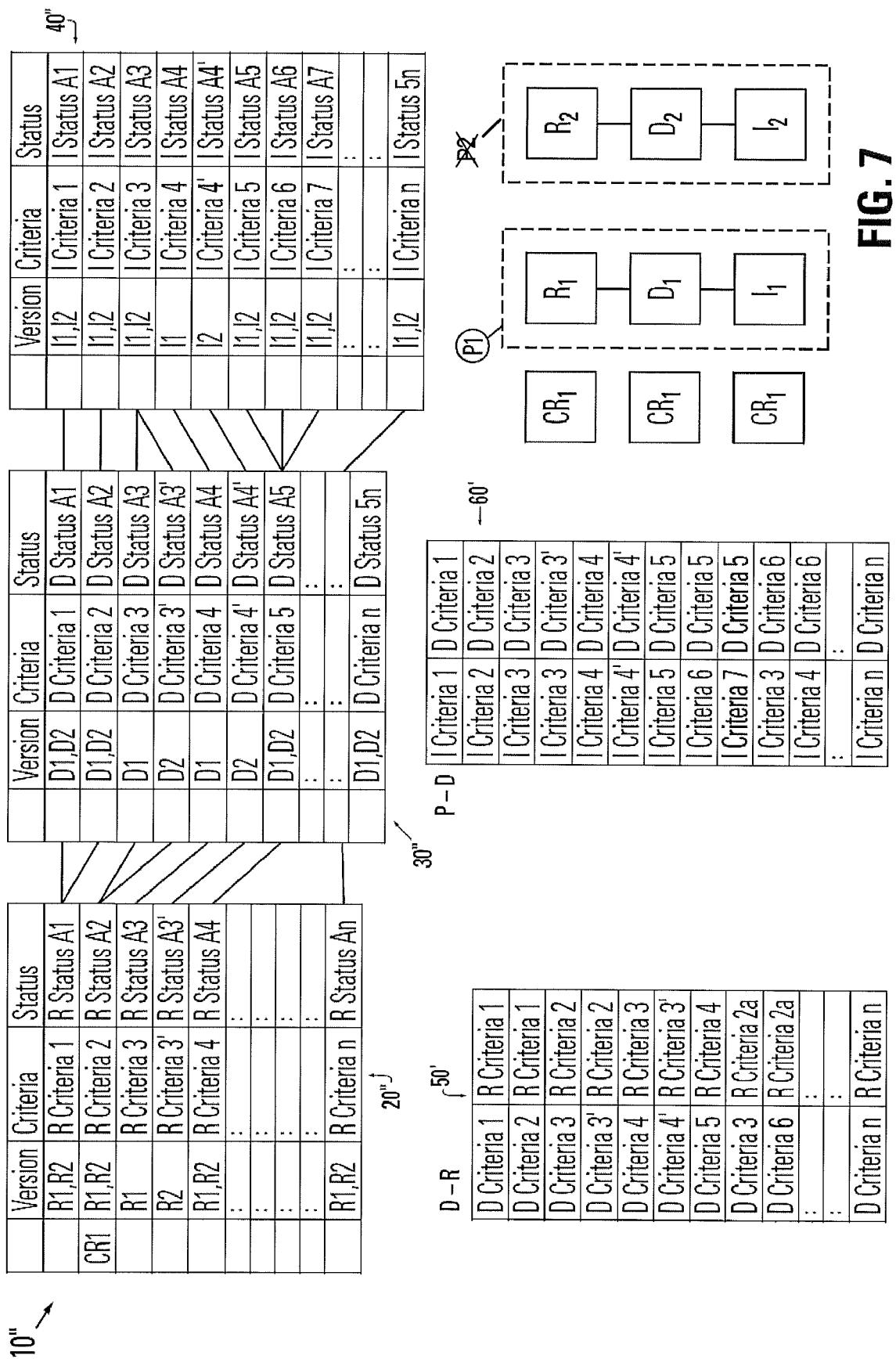
FIG. 7 illustrates the deletion of an existing criterion according to the second technique.

FIG. 7 illustrates in more detail the operation of the second technique when deleting a requirement. In this approach when a criterion is to be deleted within in an updated version an entry is simply made in the new version field for that criterion. Hence, when the data arrays are updated to the new version these entries will not be annotated with the new version indication.

Figure 8A:
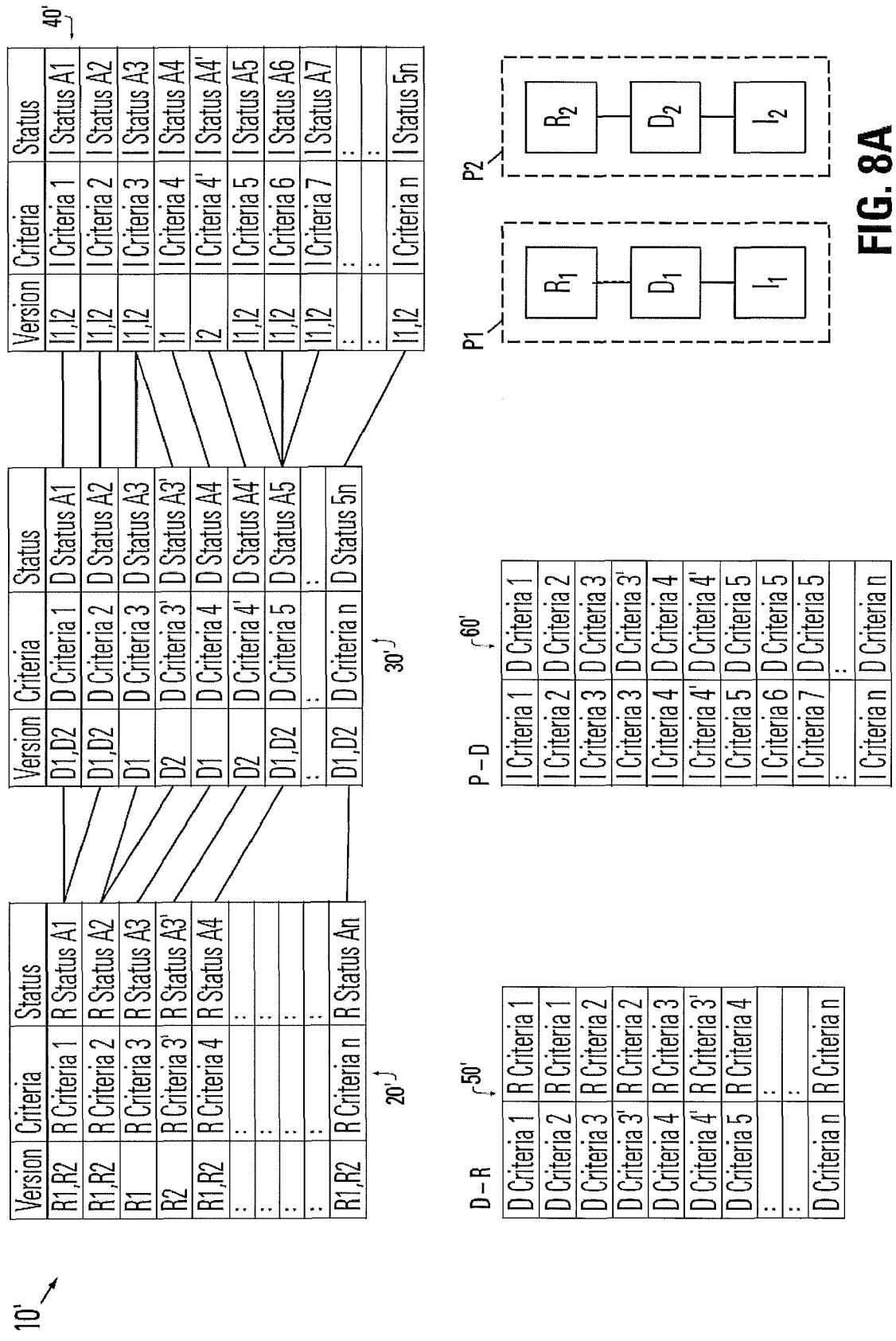
FIG. 8A illustrates a hierarchy of data arrays and their associated link tables according to one embodiment.

FIG. 8A illustrates in more detail a hierarchy 10' of data arrays and their associated link tables 50', 60' according to one embodiment. In this example there are two versions R1 and R2 of the requirements data array 20', two versions D1 and D2 of the design data array 30' and two versions I1 and I2 of the implementation data array 40'. Each data array consists of a number of rows and columns. The columns include a version field, at least one criteria field and at least one status field. Each row in the table represents a different criteria item within that data array. For example, one item in the requirements data array 20' may specify a requirement that there is the necessity to provide a hot fluid container, whilst another criteria in the requirement data array 20' may specify that the container must be able to be cleaned at 100 degrees Celsius. These criteria are built up to provide a overall definition of the requirements. These definitions are included in each of the criteria fields. Associated with each entry may be a status field which may indicate, for example, whether or not that particular criteria has been achieved.

As mentioned above, the requirements data array 20' contains two versions R1 and R2 of the requirements criteria. In the version R1 is included R criteria 1, R criteria 2, R criteria 3, R criteria 4 and R criteria n. Version R2 differs from version R1 only in that R criteria 3 is replaced with R criteria 3'.

The design array 30' includes a number of criteria intended to satisfy the requirements set out in the requirements data array 20'. Two versions D1 and D2 are provided. Once again, the two versions share many of the same criteria except that in version D2, D criteria 3 from is replaced by D criteria 3' and D criteria 4 is replaced by D criteria 4'.

The two data arrays 20' and 30' are linked in order to show the relationship between the criteria in those data arrays. For example, link table 50' shows that R criteria 1 is satisfied by D criteria 1 and D criteria 2, whilst R criteria 2 is satisfied by D criteria 3 in version D1 and by D criteria 3' in version D2, etc. Hence, it can be seen that each requirement criterion is satisfied by one or more design criteria. Equally, it may be that a number of requirements criteria are satisfied by one design criterion.

In a similar way I criteria are provided which satisfy D criteria and their links are shown in the link table 60'. For example, I criteria 1 is included to satisfy the D criteria 1, whilst I criteria 3 satisfies both D criteria 3 and D criteria 3'. Likewise, I criteria 5, I criteria 6 and I criteria 7 are all provided to meet D criteria 5. In this way, it can be seen that the different criteria for each of the versions can be expressed in the data arrays and by using the link tables the link between these criteria may be expressed.

As mentioned above, when interacting with the data hierarchy 10', a package is defined which specifies which versions of data arrays in the hierarchy 10' are to be considered. For example, a package P1 may be defined as including version R1, version D1 and version I1. Hence, when interacting with the data arrays only the criteria relevant to the versions defined by the current package are considered. For example, for the package P1, when interacting with the requirements data array 20' only R criteria 1, R criteria 2, R criteria 3, R criteria 4 and R criteria N will be indicated (which belong to version R1), R criteria 3' will not be shown since this does not belong to the current package. Hence, if R criteria 2 were to be considered then it can be seen from the link table 50' that this links with two criteria in the design data array, namely D criteria 3 and D criteria 3'. However, it can be seen from the version field of those entries that D criteria 3 relates to version D1 whilst D criteria 3' relates to version D2. Accordingly, since version D2 does not form part of the current package this entry will be filtered out and only D2 criteria 3 will be available. Similarly, from reviewing the link table 60' it can be seen that D criteria 3 links with I criteria 3. From a review of the version field for that entry it can be seen that I criteria 3 is included in version I1 (which is part of the current package) and so this entry will also be available. Hence, only criteria relevant to the current package will be available for interaction, and by using the link tables 50' and 60' it is possible to traverse between the different levels in the hierarchy to understand which criteria are included in the current package and how one criteria is related to another.

In addition, as illustrated in FIG. 8B, it is possible to include an extra field in the link tables 50" and 60" to identify which package the links are applicable to. In this way it is possible to determine the valid links for the current package without having to refer to the version field in each table to identify non-applicable links.

As shown in FIG. 8C, when a link is to be included between R Criteria 4 and D Criteria n (when within package P2) and using the link tables shown in FIG. 8A, there is a potential for ambiguity to arise and so a duplicate entry for R Criteria 4 is made. The version indicator for R2 is deleted, the duplicate entry has version indicator R2 in the version field and a new link is provided in the link table 50' linking D Criteria n with R Criteria 4.

Figure 8D:
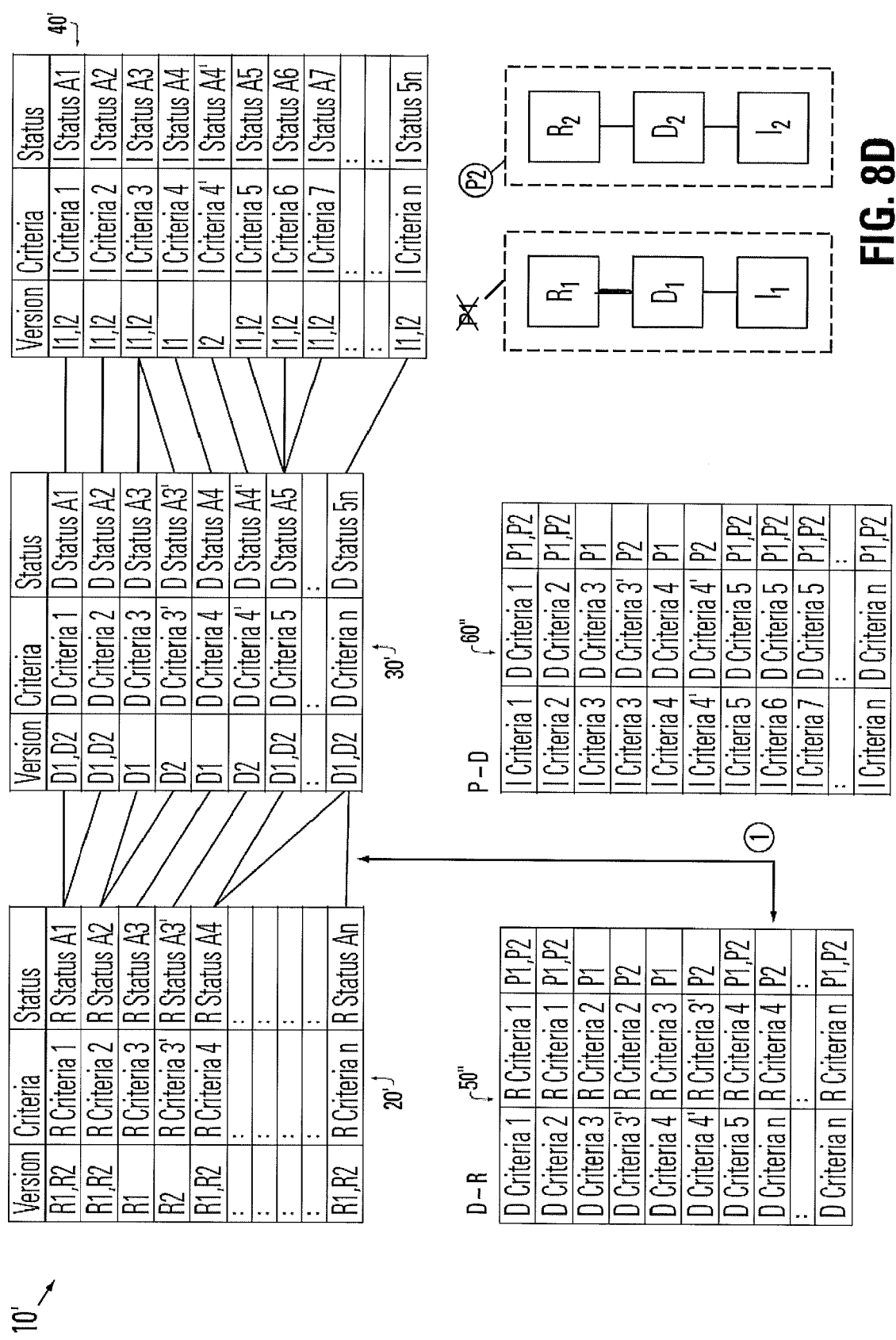
FIG. 8D illustrates adding a link to the data arrays and their associated link tables according to FIG. 8B.

As shown in FIG. 8D, when a link is to be included between R Criteria 4 and D Criteria n (when within package P2) and using the link tables shown in FIG. 8B, there is a potential for ambiguity to arise but no duplicate entry for R Criteria 4 need be made. Instead, a new link is provided in the link table 50" linking D Criteria n with R Criteria 4 and this is annotated with package P2.

It will be appreciated that the link tables illustrated in all the Figures may contain a unique identifier identifying each of the respective criterion or may instead contain an identifier identifying each data entry for that criteria.

Figure 9A:
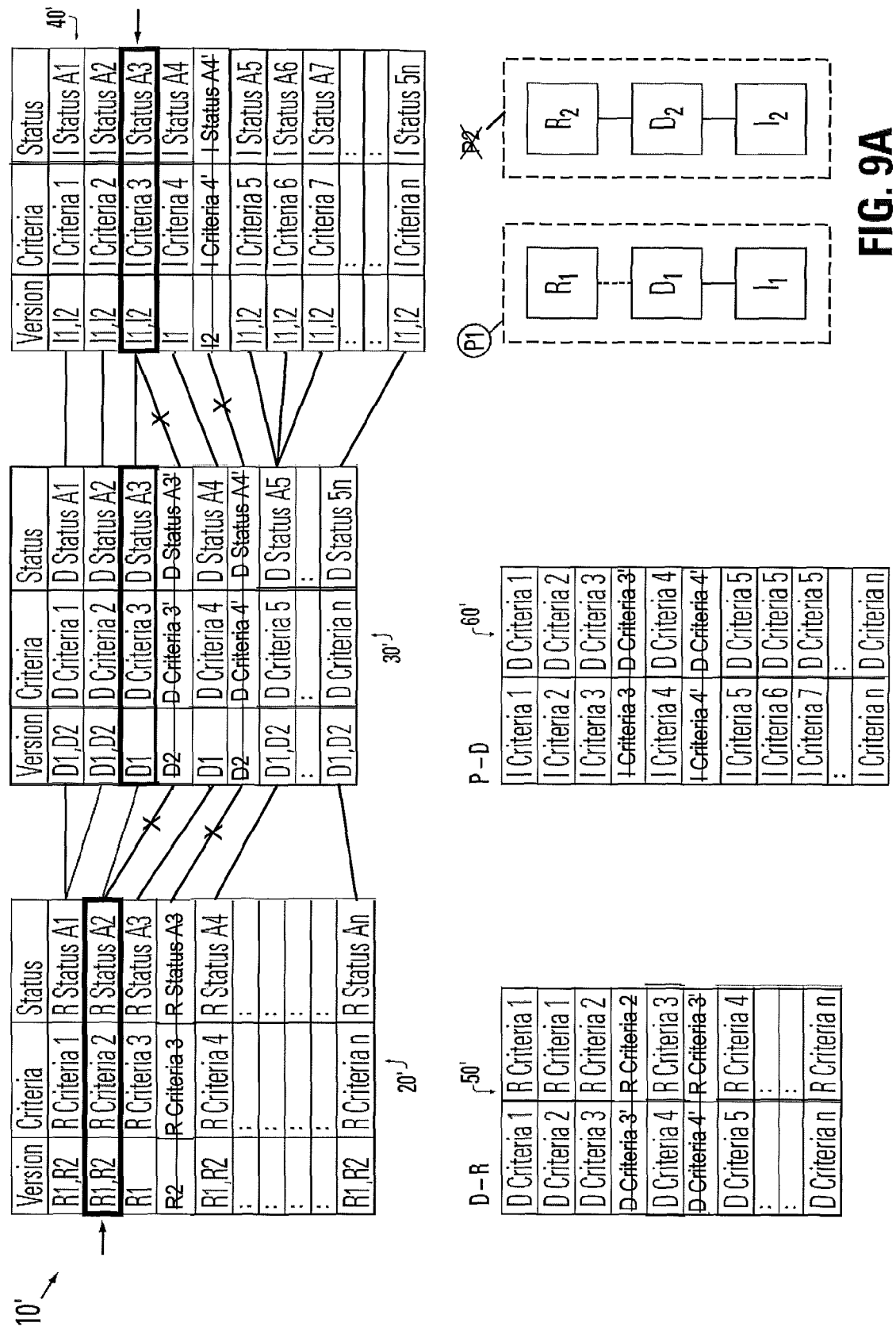
FIG. 9A illustrates traversing the hierarchy of data arrays shown in FIG. 8A.

To illustrate traversing between the levels in more detail, FIG. 9 shows how selecting a package influences the available entries within the data arrays. For example, consider that package P1 is selected. Package P1 contains version R1 so any entry not related to version R1 is not available for selection. Similarly, package P1 contains version D1 and version I1 and so any criteria not associated with those versions is not available. Also, any links not associated with the current package are indicated as not available in the link tables.

Hence, if a user were to wish to be provided with the criteria from the design data array 30' then he would be provided with D criteria 1, D criteria 2, D criteria 3, D criteria 4, D criteria 5 and D criteria N. Were he to select D criteria 3 then this would link with R criteria 2 in the requirements data array 20' and I criteria 3 in the implementation data array 40'. Were the user to select R criteria 2 in the requirements data array 20' then the link to D criteria 3' will not be accessible since this criteria is not part of the current package. In this way, it can be seen that only the criteria relevant to the current package is available and can be traversed.

Figure 9B:
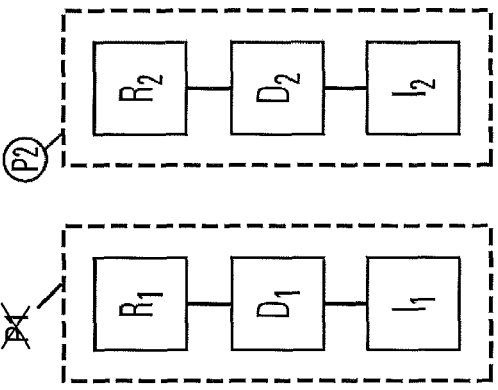
FIG. 9B illustrates traversing the hierarchy of data arrays shown in FIG. 8B.

Similarly, for FIG. 9B, should package P2 be selected then any entry in the versions of the data arrays which do not relate to the versions specified by the package can be excluded. Also, since the link tables 50" and 60" also contain the packages to which each link relates then any links not related to the current package can be ignored without having to refer to the associated data arrays in order to determine the versions to which those links relate. It will be appreciated that this helps to simplify the process for ignoring links.

The above-mentioned embodiments are typically implemented in software and executed on a data processing apparatus, generally 200, as shown in FIG. 10. As can be seen in FIG. 10, the data processing apparatus comprises memory 210 operable to store a computer program 230 transferred from a broadcast or physical media according to embodiments, as well as storing the hierarchy of data arrays. The computer program is executed by a microprocessor 220 in response to requests made by a user (not shown) via a user interface 240 and the results displayed on a display 250.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

The invention claimed is:

1. A method of representing and providing access to old and new versions of a hierarchical set of engineering project documents stored in a hierarchy of data arrays, the data arrays corresponding to the documents in the hierarchy of documents, the method including:

representing one or more old versions of the hierarchical set of documents stored in computer readable memory as packages of data entry rows in at least two data arrays in a hierarchy, wherein a new version of the documents is based on an addition to or change in an old version of the documents;

wherein each data array includes a plurality of data entry rows, each data entry row includes a plurality of fields, and the plurality of fields includes at least one version field that indicates one or more versions of the documents to which the data entry row belongs;

wherein the plurality of fields further includes at least one characteristic field of document data;

initializing a package of data entry rows representing one of the old versions of the documents to represent a new version of the documents by appending a new version indicator to the data entry rows representing the old version; and responding to queries for all or part of a particular version of the hierarchical set of documents using a processor to filter the data entry rows from the at least two data arrays based on the version field and to select particular data entry rows that represent the particular version.

2. The method of claim 1, wherein initializing the data entry rows to represent a new version includes appending the new version indicator to the version field of the data entry rows representing the old version.

3. The method of claim 2, further including generating a link array that includes at least one link entry, each link entry linking a first data entry row in a lower data array in the hierarchy with a second data entry row in a higher data array in the hierarchy.

4. The method of claim 3, wherein each link entry provides a first linking indicator indicating the first data entry row in said lower data array and a second linking indicator indicating the second data entry row in the higher data array.

5. The method of claim 4, wherein each link entry includes a package indicator of at least one package with which that link entry is associated.

6. The method of claim 1, further including filtering out fields within data entry rows that are not associated with the package.

7. The method claim 1, further including filtering out characteristic fields within data entry rows that are not associated with the package.

8. The method of claim 3, further including:

in response to a selection of a selected characteristic field within a data entry row in the package, determining with reference to said link array other data entries in said hierarchy of data arrays in said package with which said selected data entry is linked.

9. The method of claim 3, further including:

in response to a request to include an additional characteristic in the package, adding an additional data entry row with the additional characteristic and updating the version field of the additional data entry row with an indication of a version that includes the additional characteristic.

10. The method of claim 9, further including:

updating the link array to link the additional data entry row with one or more existing data entry rows within the package.

11. The method of claim 3, further including:

in response to a request to alter a characteristic field within a data entry row in the package, including an altered data entry row in the package, the version field of the altered data entry row having an indication of a new version of the package and said characteristic field of the altered data entry row including an indication of the altered characteristic.

12. The method of claim 11, further including:

identifying link entries associating said altered data entry row and other data entry rows in the package;

adding to the link array one or more link entries associating the altered data entry row with each of said any other data entry rows in the package; and removing from the link array any link entries associating an unaltered version of the altered data entry row with the package.

13. The method of claim 3, further including:

in response to a request to link a first data entry row in a first data array with a second data entry row in a second data array as parts of a particular package, the first and second data entry rows each belonging to at least one common package, updating the version field of the first data entry row to remove any indication of the new version specified by said package and adding an additional data entry row to that data array, the version field of the additional data entry row having an indication of the new version specified by the package and the characteristic field of the additional data entry row being identical to that of said first data entry row.

14. The method of claim 13, comprising the step of:

adding to said link array link a link entry associating the additional data entry row and the second data entry row.

15. The method of claim 3, further including:

in response to a request to delete a specific data entry row from a specific package, updating the specific data entry row to remove any new version indicator that indicates belonging to the specific package.

16. The method of claim 15, further including:

removing from the link array any entries associating the deleted data entry row and any other data entry rows within said hierarchy of data arrays which are not within any package.

17. The method of claim 1, wherein the plurality of fields includes a status field, the method further including:

in response to a request to alter the status field of a specific data entry row, replicating the status field to be altered to create a replicated status field for each data entry row in a same data array as the specific data entry row, indicating that said replicated status field is associated with the new version by associating the replicated status field with the new version and indicating that the status field to be altered is associated with the old version by associating the status field to be altered with the old previous version.

18. The method of claim 1, wherein a particular package of data entry rows, which belong to a predetermined version, is to be updated to a temporary version based on the predetermined version, further including:

appending a temporary version field to each data entry row in the particular package that belongs to the predetermined version.

19. The method of claim 18, further including:

responding to a request to alter a field within a specific data entry row in the package, updating the temporary version field of the specific data entry row with a temporary version indicator, adding an altered data entry row with the temporary version field and updating the temporary version field with the temporary version indicator.

20. The method of claim 19, further including:

identifying link entries associated with the altered data entry row and the package; and adding to the link array one or more link entries associating the altered data entry row with the package.

21. The method of claim 18, further including:

in response to a request to delete a data entry row, updating the version field of the data entry row to be deleted to provide an indication of the temporary version specified by the package.

22. The method of claim 18, further including:
in response to a request to recreate the package by converting the temporary version to a permanent new version, appending a new version indicator indicative of the permanent new version to the version field of each data entry row belonging to the temporary version.

23. The method of claim 22, further including:
in case, for any data entry row, more than one temporary version is indicated in said temporary version field, performing a step of identifying a possible incompatibility by determining whether said more than one temporary versions relate to alterations within different fields and, if so, merging the alterations when converting the temporary version to a permanent new version.

24. The method of claim 22, further including:
in case, for any data entry row, more than one temporary version is indicated in the temporary version field, performing a step of identifying a possible incompatibility by determining whether said more than one temporary versions relate to alterations within common fields and, if so, indicating that an incompatibility between temporary versions has occurred.

25. A non-transitory memory storing a computer-program including instructions operable, when executed on a computer, to perform a method including:
representing and providing access to old and new versions of a hierarchical set of engineering project documents stored in a hierarchy of data arrays, the data arrays corresponding to the documents in the hierarchy of documents, further including,
representing one or more of old versions of the hierarchical set of documents stored in computer readable memory as packages of data entry rows in at least two data arrays in a hierarchy,
wherein a new version of the documents is based on an addition to or change in an old version of the documents;
wherein each data array includes a plurality of data entry rows, each data entry row includes a plurality of fields, and the plurality of fields includes at least one version field that indicates one or more versions of the documents to which the data entry of the row belongs;
wherein the plurality of fields further includes at least one characteristic field of document data;
initializing a package of data entry rows representing one of the old versions of the documents to represent a new version of the documents by appending a new version indicator to the data entry rows representing the old version; and
responding to queries for all or part of a particular version of the hierarchical set of documents using a processor to filter the data entry rows from the at least two data arrays based on the version field and to select particular data entry rows that represent the particular version.

* * * * *